US012167506B2

(12) United States Patent
Malamud et al.

(10) Patent No.: US 12,167,506 B2
(45) Date of Patent: Dec. 10, 2024

(54) WIRE COMMUNICATION IN AN E-VAPING DEVICE

(71) Applicant: Altria Client Services LLC, Richmond, VA (US)

(72) Inventors: Alex Malamud, Jerusalem (IL); Shai Cohen, Jerusalem (IL); Amit Dar, Modiin (IL)

(73) Assignee: Altria Client Services LLC, Richmond, VA (US)

( * ) Notice: Subject to any disclaimer, the term of this patent is extended or adjusted under 35 U.S.C. 154(b) by 1057 days.

(21) Appl. No.: 16/952,664

(22) Filed: Nov. 19, 2020

(65) Prior Publication Data

US 2021/0068465 A1 Mar. 11, 2021

Related U.S. Application Data

(62) Division of application No. 15/988,549, filed on May 24, 2018, now Pat. No. 10,888,122, which is a
(Continued)

(51) Int. Cl.
*H05B 1/02* (2006.01)
*A24F 40/53* (2020.01)
(Continued)

(52) U.S. Cl.
CPC ........... *H05B 1/0244* (2013.01); *A24F 40/53* (2020.01); *A24F 40/60* (2020.01); *A24F 40/10* (2020.01); *A24F 40/40* (2020.01)

(58) Field of Classification Search
None
See application file for complete search history.

(56) References Cited

U.S. PATENT DOCUMENTS

2011/0304282 A1 12/2011 Li et al.
2013/0284192 A1 10/2013 Peleg et al.

FOREIGN PATENT DOCUMENTS

CN 1209731 A 3/1999
CN 101132823 A 2/2008
(Continued)

OTHER PUBLICATIONS

International Search Report (PCT/ISA/210) and Written Opinion (PCT/ISA/237) for International Application No. PCT/IB2015/000652 mailed on Sep. 10, 2015.
(Continued)

*Primary Examiner* — Matthew D Krcha
(74) *Attorney, Agent, or Firm* — Harness, Dickey & Pierce, P.L.C.

(57) ABSTRACT

An e-vaping device includes a liquid storage portion for storing an e-liquid; a memory device storing cartomizer information; a vaporizer including a heating element, the vaporizer being in fluid communication with the liquid storage portion and configured to vaporize e-liquid stored in the liquid storage portion; a power supply configured to provide power to the vaporizer; a controller configured to control provision of power to the vaporizer based on the cartomizer information; and a switching architecture configured to selectively prevent a flow of current through the heating element, when the memory device sends data to the controller.

5 Claims, 14 Drawing Sheets

Related U.S. Application Data division of application No. 14/606,874, filed on Jan. 27, 2015, now Pat. No. 9,980,514.

(60) Provisional application No. 61/932,084, filed on Jan. 27, 2014.

(51) Int. Cl.

| | |
|---|---|
| ***A24F 40/60*** | (2020.01) |
| *A24F 40/10* | (2020.01) |
| *A24F 40/40* | (2020.01) |

(56) References Cited

FOREIGN PATENT DOCUMENTS

| | | | | | |
|---|---|---|---|---|---|
| CN | 201067079 | Y | | 6/2008 | |
| CN | 101524187 | A | | 9/2009 | |
| CN | 201900065 | U | | 7/2011 | |
| CN | 202340821 | U | | 7/2012 | |
| CN | 102793276 | A | | 11/2012 | |
| CN | 102970885 | A | | 3/2013 | |
| CN | 203166461 | U | | 8/2013 | |
| CN | 203166473 | U | | 8/2013 | |
| CN | 103338663 | A | | 10/2013 | |
| CN | 203341005 | U | | 12/2013 | |
| EP | 2399636 | A1 | * | 12/2011 | ........... A24F 47/008 |
| WO | WO-2012085205 | A1 | | 6/2012 | |

OTHER PUBLICATIONS

International Preliminary Report on Patentability for International Application No. PCT/IB2015/000652 mailed on Aug. 11, 2016.

Office Action for Corresponding European Patent Application No. 15728928.1 issued on Sep. 2, 2016.

Eurasian Office Action for Patent Application No. 201691523 issued on Jan. 24, 2018 and English translation thereof.

Office Action for Corresponding Chinese Patent Application No. 201580005691.7 issued on Jun. 5, 2018 and English translation thereof.

Eurasian Office Action for Patent Application No. 201691523 issued on Oct. 10, 2018 and English translation thereof.

Office Action for Corresponding Chinese Patent Application No. 201580005691.7 issued on Feb. 2, 2019 and English translation thereof.

Office Action for Corresponding Israeli Patent Application No. 245819 issued on Apr. 29, 2019.

* cited by examiner

WIRE COMMUNICATION IN AN E-VAPING DEVICE

CROSS-REFERENCE TO RELATED APPLICATION

This U.S. non-provisional patent application is a divisional of U.S. application Ser. No. 15/988,549 filed on May 24, 2018, which is a divisional of U.S. application Ser. No. 14/606,874 filed on Jan. 27, 2015, which claims the benefit of provisional U.S. Application No. 61/932,084 filed on Jan. 27, 2014, the disclosures of each of which are hereby incorporated by reference in their entirety.

BACKGROUND

1. Field

Example embodiments relate generally to an e-vaping device.

2. Related Art

Electronic vaping (e-vaping) devices are used to vaporize a liquid material into an aerosol or "vapor" in order for an adult vaper to inhale the vapor. These electronic vaping devices may be referred to as e-vaping devices. E-vaping devices include a heater which vaporizes liquid material to produce an aerosol. An e-vaping device may include several e-vaping elements including a power source, a cartridge or e-vaping tank including the heater and along with a reservoir capable of holding the liquid material. During the usage of these devices, once the liquid in the cartridge is exhausted, an adult vaper may replace it with a new cartridge containing fresh liquid, for continuing the usage of the device.

SUMMARY

According to at least one example embodiment, an e-vaping device includes a liquid storage portion for storing an e-liquid; a memory device storing cartomizer information; a vaporizer including a heating element, the vaporizer being in fluid communication with the liquid storage portion and configured to vaporize e-liquid stored in the liquid storage portion; a power supply configured to provide power to the vaporizer; a controller configured to control provision of power to the vaporizer based on the cartomizer information; and a switching architecture configured to selectively prevent a flow of current through the heating element, when the memory device sends data to the controller.

The e-vaping device may further include a power supply line configured to supply power from the power supply to the heating element, and configured to receive data sent from the memory device to the controller.

The switching architecture may include at least a first electronic switch; and a switch control device configured to control the first electronic switch.

The first electronic switch may be located on the power supply line or connected in between the power supply line and the heating element, such that the first electronic switch selectively controls an electrical connection between the heating element and at least a portion of the power supply line, the first electronic switch being configured to control the electrical connection based on a control signal received from the switch control device.

The e-vaping device may further include a ground line forming an electrical path between the heating element and a ground node of the e-vaping device, wherein the first electronic switch is connected in between the ground node and the heating element, such that the first electronic switch controls an electrical connection between the heating element and the ground node, the first electronic switch being configured to control the electrical connection based on a control signal received from the switch control device.

The e-vaping device may further include a first section; a second section; and a connector device connecting the first and second sections to each other, the first section including the liquid storage portion, the memory device, the vaporizer, and the switching architecture, the second section including the power supply and the controller.

The controller may be configured to receive an indication of the cartomizer information from the memory device; and the controller is configured to control at least one of the power supply and a connection between the power supply and the heating element to prevent the heating element from generating heat, when the first information indicates an amount of e-liquid stored in the liquid storage portion is below a threshold level.

According to at least one example embodiment, a cartomizer may include a liquid storage portion for storing an e-liquid; a memory device storing cartomizer information; a vaporizer including a heating element, the vaporizer being in fluid communication with the liquid storage portion and configured to vaporize e-liquid stored in the liquid storage portion; and a switching architecture configured to selectively prevent a flow of current through the heating element, when the memory device sends data to a controller.

The cartomizer may further include a power supply line configured to supply power from a power supply to the heating element, and configured to receive data sent from the memory device to the controller.

The switching architecture may include at least a first electronic switch; and a switch control device configured to control the first electronic switch.

At least the first electronic switch may be located on the power supply line or connected in between the power supply line and the heating element, such that the first electronic switch selectively controls an electrical connection between the heating element and at least a portion of the power supply line, the first electronic switch being configured to control the electrical connection based on a control signal received from the switch control device.

The cartomizer may further include a ground line forming an electrical path between the heating element and a ground node of the e-vaping device, wherein the first electronic switch is connected in between the ground node and the heating element, such that the first electronic switch controls an electrical connection between the heating element and the ground node, the first electronic switch being configured to control the electrical connection based on a control signal received from the switch control device.

According to at least one example embodiment, a cartomizer may include a liquid storage portion for storing an e-liquid; a memory device storing cartomizer information; a vaporizer including a heating element, the vaporizer being in fluid communication with the liquid storage portion and configured to vaporize e-liquid stored in the liquid storage portion; and a switching architecture configured to selectively isolate the heating element from a power supply, when the memory device sends data to a controller.

The cartomizer may further include a power supply line configured to supply power from a power supply to the heating element, and configured to receive data sent from the memory device to the controller.

The switching architecture may include at least a first electronic switch; and a switch control device configured to control the first electronic switch.

The first electronic switch may be located on the power supply line or connected in between the power supply line and the heating element, such that the first electronic switch selectively controls an electrical connection between the heating element and at least a portion of the power supply line, the first electronic switch being configured to control the electrical connection based on a control signal received from the switch control device.

The cartomizer may further include a ground line forming an electrical path between the heating element and a ground node of the e-vaping device, wherein the first electronic switch is connected in between the ground node and the heating element, such that the first electronic switch controls an electrical connection between the heating element and the ground node, the first electronic switch being configured to control the electrical connection based on a control signal received from the switch control device.

According to at least one example embodiment, a method of operating an e-vaping device including a controller, a power source, a liquid storage portion for storing liquid material, a vaporizer, a memory device, and a switching architecture includes receiving, at the controller, first information stored in the memory device, and controlling the switching architecture to prevent current from flowing through a heater included in the vaporizer while the controller receives the first information from the memory device.

The switching architecture may include at least a first electronic switch, and the method may further include detecting a flow of air through an air channel of the e-vaping device; and based on the detection of the flow of air, controlling the first electronic switch to allow current to flow through the heater, and sending a power signal to the heater to cause the heater to generate heat.

The e-vaping device may include a power supply line configured to supply power from the power source to the heater, and the first electronic switch may be located on the power supply line or connected in between the power supply line and the heater, such that the first electronic switch controls an electrical connection between the heater and the power supply line, and the controlling the switching architecture may control the first electronic switch to open the electrical connection between the heater and the power supply line such that current is prevented from flowing through the heater.

The e-vaping device may include a ground line forming an electrical path between the heater and a ground node of the e-vaping device, and the first electronic switch may be connected in between the ground node and the heater, such that the first electronic switch controls an electrical connection between the heater and the ground node, and the controlling the switching architecture may control the first electronic switch to open the electrical connection between the heater and the ground node such that current is prevented from flowing through the heater.

The method may further include storing first information in the memory device; receiving, at the controller from the memory device, an indication of the first information; and preventing the heater from generating heat, when the first information indicates an amount of liquid material stored in the liquid storage portion is below a threshold level.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
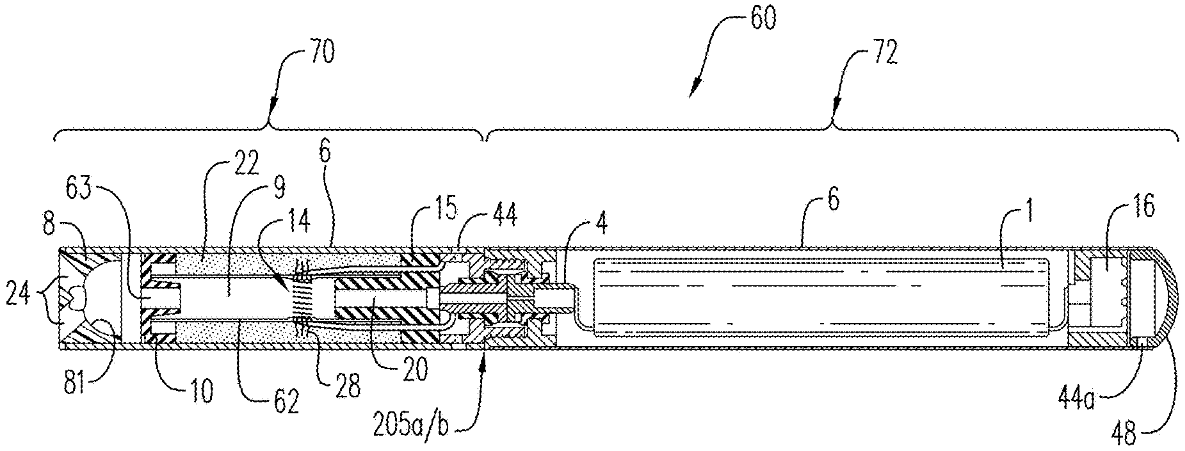
FIG. 1A is a cross-sectional view of an e-vaping device according to a first embodiment wherein the mouth end insert includes diverging outlets, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

An electronic vaping (e-vaping) device may include a battery portion and a cartomizer portion. The battery portion of the e-vaping device includes a controller and battery for powering the device and the cartomizer portion generates an aerosol mist (i.e. vapor). In particular, the cartomizer may use heat, ultrasonic energy, or other means to vaporize an "e-Liquid" solution (e.g., based on propylene glycol, or glycerin, for example including taste and fragrance ingredients) into an aerosol mist. The vaporization may be similar to, for example, nebulizer or humidifier vaporizing solutions for inhalation. The cartomizer may vaporize the e-liquid using a heating element that heats the e-liquid to generate the vapor. The heating element may become quite hot in order to properly heat the e-liquid and depending on the duration of usage of the e-vaping device. Excessive heat within the e-vaping device may cause burning or some other chemical transformation of the e-liquid, and even might cause burning of the internal components of the e-vaping device. For example, burning may occur when a cartridge filled with a liquid becomes empty, or the liquid falls below a desired level, such as when the liquid has evaporated or been vaporized as part of the e-vaping device vaping process. Burning may result an altered taste of the vapor produced by an e-vaping device, and an adult vaper of an e-vaping device may not be able to predict when the burning will occur.

FIG. 1A is a cross-sectional view of an e-vaping device according to a first embodiment. As shown in FIG. 1A, a novel e-vaping device 60 comprises a replaceable cartridge (or first section) 70 and a reusable fixture (or second section) 72, which may be, for example, coupled together at a threaded connection 205*a/b* (where 205*a* is a male threaded connection on cartridge 70, and 205*b* is a female threaded connection on reusable fixture 72) or by other convenience such as a snug-fit, detent, clamp and/or clasp. The cartridge 70 includes an outer tube 6 (or casing) extending in a longitudinal direction and an inner tube 62 coaxially positioned within the outer tube or casing 6. The reusable fixture 72 can also include an outer tube 6 (or casing) extending in a longitudinal direction. In an alternative embodiment, the outer tube 6 can be a single tube housing both the cartridge 70 and the reusable fixture 72 and the entire e-vaping device 60 can be disposable.

Referring again to FIG. 1A, the e-vaping device 60 can also include a central air passage 20 defined in part by inner tube 62 and an upstream seal 15. Moreover, the e-vaping device 60 includes a liquid supply reservoir 22. The liquid supply comprises a liquid material and optionally a liquid storage medium 21 operable to store the liquid material therein. In an embodiment, the liquid supply reservoir 22 is contained in an outer annulus between the outer tube 6 and the inner tube 62. The annulus is sealed at an upstream end by the seal 15 and by a liquid stopper 10 at a downstream end so as to prevent leakage of the liquid material from the liquid supply reservoir 22.

In an embodiment, a heater 14 is also contained in the inner tube 62 downstream of and in spaced apart relation to the portion of central air passage 20 defined by the seal 15. According to at least one example embodiment, the heater 14 is implemented as a heating coil. Accordingly, as used herein, the term "heater 14" is referred to interchangeably as the "heating coil 14". However, according to at least one example embodiment, the heater 14 may have a shape other than a coil. The heater 14 can be in the form of a wire coil, a planar body, a ceramic body, a single wire, a cage of resistive wire or any other suitable form. A wick 28 is in communication with the liquid material in the liquid supply reservoir 22 and in communication with the heater 14 such that the wick 28 disposes liquid material in proximate relation to the heater 14. The heater 14 and the wick 28, together, form a vaporizer. The wick 28 may be constructed of a fibrous and flexible material. The wick 28 may include at least one filament having a capacity to draw a liquid. For example, the wick 28 may comprise a bundle of filaments which may include glass (or ceramic) filaments, or may be of an organic source like cotton fibers. In another embodiment, a bundle comprising a group of windings of glass filaments, for example, three of such windings, all which arrangements are capable of drawing liquid via capillary action via interstitial spacing between the filaments. A power supply 1 in the reusable fixture 72 may be operably connected to the heater 14 (as described below) to apply voltage across the heater 14. The e-vaping device 60 may also include at least one air inlet 44 operable to deliver air to the central air passage 20 and/or other portions of the inner tube 62.

Figure 7:
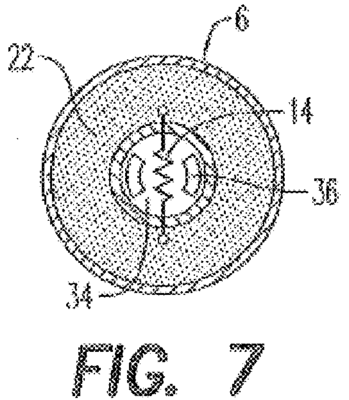
FIG. 7 is a cross-sectional view along line A-A of the e-vaping of FIG. 6, in accordance with an example embodiment.
Figure 8:
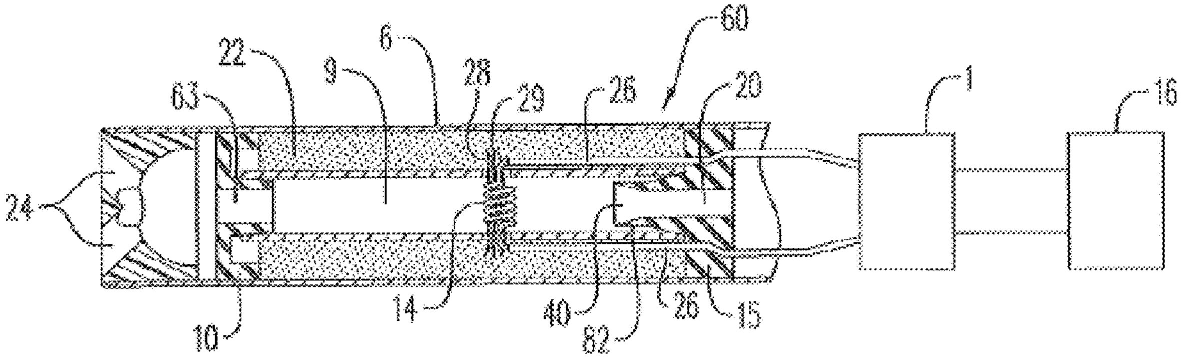
FIG. 8 is a cross-sectional view of an embodiment wherein an e-vaping device includes an air flow diverter, in accordance with an example embodiment.
Figure 13:
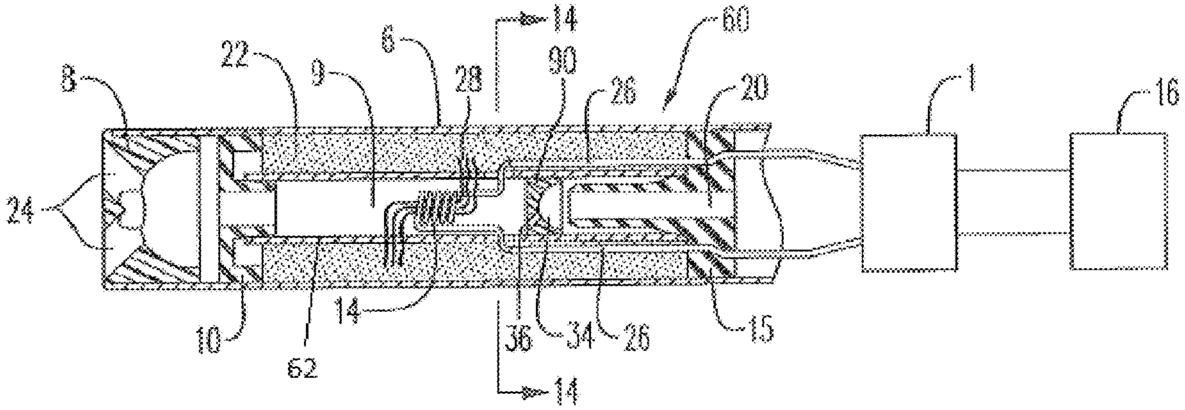
FIG. 13 is a cross-sectional view of an embodiment wherein an e-vaping device includes an air flow diverter, in accordance with an example embodiment.

According to at least one example embodiment, the e-vaping device 60 further includes a mouth end insert 8 having at least two off-axis, diverging outlets 24. The mouth end insert 8 is in fluid communication with the central air passage 20 via the interior of inner tube 62 and a central passage 63, which extends through the stopper 10. Moreover, as shown in FIGS. 7 and 8, according to at least one example embodiment, the heater 14 extends in a direction transverse to the longitudinal direction and heats the liquid material to a temperature sufficient to vaporize the liquid material and form an aerosol. In other embodiments, other orientations of the heater 14 are contemplated. For example, as shown in FIG. 13, according to at least one example embodiment, the heated portion of the wick 28 can be arranged longitudinally within the inner tube 62. As shown, the heater 14 is arranged centrally within the inner tube 62. However, in other embodiments the heater 14 can be arranged adjacent an inner surface of the inner tube 62.

Referring now to FIG. 1A, the wick 28, liquid supply reservoir 22 and mouth end insert 8 are contained in the cartridge 70 and the power supply 1 is contained in the second section 72. In one embodiment, the first section (the cartridge) 70 is disposable and the second section (the fixture) 72 is reusable. The sections 70 and 72 can be attached, for example, by a threaded connection 205, as described above, whereby the downstream section 70 can be replaced at an adult vaper's will e.g. when the liquid supply reservoir 22 is used up. Having a separate first section 70 and second section 72 provides a number of advantages. First, if the first section 70 contains the at least one heater 14, the liquid supply reservoir 22 and the wick 28, all elements which are potentially in contact with the liquid are disposed of when the first section 70 is replaced. Thus, there will be no cross-contamination between different mouth end inserts 8, for example, when using different liquid materials. Also, if the first section 70 is replaced at suitable intervals, there is little chance of the heater becoming clogged with liquid. Optionally, the first section 70 and the second section 72 are arranged to releasably lock together when engaged. Another advantage of this arrangement is the mechanical agility of the two parts, and the connector between them, that, in turn protects the inner parts.

Figure 10:
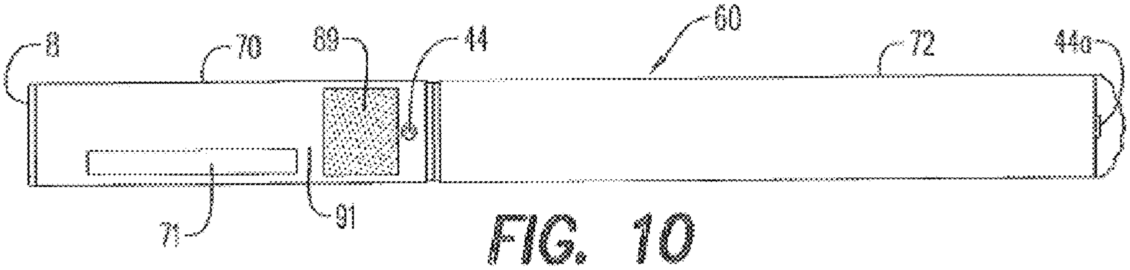
FIG. 10 is a top view of an e-vaping device including an aroma strip on an outer surface thereof, in accordance with an example embodiment.

In one embodiment, as shown in FIG. 10, the outer tube 6 can include a clear (transparent) window 71 formed of a transparent material so as to allow an adult vaper to see the amount of liquid material remaining in the liquid supply reservoir 22. The clear window 71 can extend at least a portion of the length of the first section 70 and can extend fully or partially about the circumference of the first section 70. In another embodiment, the outer tube 6 can be at least partially formed of a transparent material so as to allow an adult vaper to see the amount of liquid material remaining in the liquid supply reservoir 22.

In an embodiment, the at least one air inlet 44 includes one or two air inlets 44, 44'. Alternatively, there may be three, four, five or more air inlets. If there is more than one air inlet 44, 44', the air inlets 44, 44' are located at different locations along the e-vaping device 60. For example, as shown in FIG. 1A, an air inlet 44*a* can be positioned at the upstream end of the e-vaping device adjacent a puff sensor 16 such that the puff sensor 16 supplies power to the heater 14 upon sensing a puff by the adult vaper. Air inlet 44*a* should communicate with the mouth end insert 8 so that a draw upon the mouth end insert activates the puff sensor 16. The air from the air inlet 44*a* can then flow along the battery and to the central air passage 20 in the seal 15 and/or to other portions of the inner tube 62 and/or outer tube 6. At least one additional air inlet 44, 44' can be located adjacent and upstream of the seal 15 or at any other desirable location. Altering the size and number of air inlets 44, 44' can also aid in establishing the resistance to draw of the e-vaping device 60.

Figure 1B:
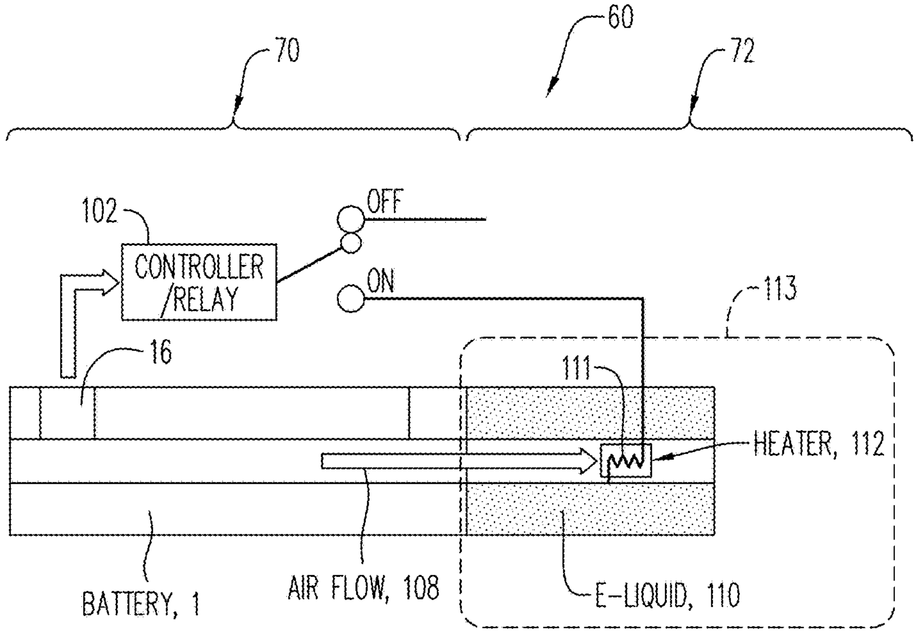
FIG. 1B is a diagram of the e-vaping device of FIG. 1A for describing an operation of a puff sensor of the e-vaping device, according to at least one example embodiment.

FIG. 1B is a diagram of the e-vaping device 60 for describing an operation of the puff sensor 16. As is illustrated in FIGS. 1A and 1B, the e-vaping device may include the puff sensor 16. According to at least one example embodiment, the puff sensor 16 may include control circuitry including for example, a controller 102. Further, the puff sensor 16 may control the operation of elements of the e-vaping device 60 including, for example, the vaporizer 111. The vapor produced by an e-vaping device is created by turning an e-liquid 110 into mist and some vapor with the vaporizer 111. As is illustrated in FIG. 1B, the e-vaping device 60 may optionally include an aerosol generator 112 which may work in conjunction with the vaporizer 111 to vaporize the e-liquid 110. The e-Liquid 110 may be stored in a liquid container including, for example, the liquid reservoir 22 illustrated in FIG. 1A. According to at least one embodiment, the e-vaping device 60 may include a cartomizer 113. The cartomizer 113 may include the e-liquid 110, the vaporizer 111, and the aerosol generator 112. The cartomizer 113 may also be referred to as a cartridge (e.g., cartridge/first section 70 of FIG. 1A) throughout this disclosure and may be disposable. The e-liquid 110 may have a high viscosity at room temperature to enable longer shelf life and reduce leakages. However, the high viscosity may reduce the vaporization rate. The e-liquid is vaporized via air flow 108, generated by the inhalation of an adult user of an e-vaping device. In order to reduce the viscosity, to a level enabling vaporization, external heat may be applied through the vaporizer 111, which may include the heating coil 14 and the wick 28 illustrated in FIG. 1A, where the wick 28 is in fluid communication with, soaked in or includes a portion of the e-liquid 110. Accordingly, in at least one embodiment, the vaporizer 111 may be the heating coil 14 wrapped around the wick 28 in order to heat the liquid on the wick 28. Local viscosity may be reduced via heating, while inhalation by an adult vaper occurs, enabling vaporization in the inhalation-generated flow of air 108. The e-Liquid 110 may be heated via an electric current flowing through the vaporizer 111 and may then be vaporized through the e-vaping device 60 and may contain tastes and aromas that create a particular vaping experience for the adult vaper. The controller 102 of the puff sensor 16 may be activated by air flow 108 (e.g., from the air inhaled by the adult vaper) passing the puff sensor 16. The puff sensor 16 may be activated, for example, by the pressure drop across the puff sensor 16. In response to detecting the drop in pressure at the puff sensor 16, the puff sensor 16 may switch the battery 1 power (e.g., current) on. For example, the controller 102 may receive a signal indicating the above-referenced pressure drop and, in response to the signal, the controller 102 may then switch the battery 1 current on. Although illustrated as separate from the e-vaping device 60, the controller 102 may be a part of the e-vaping device. For example, as is discussed above, the controller 102 may be part of the puff sensor 16. As used in the present disclosure, the term "battery 1" is used interchangeably with the term "power supply 1". However, a battery is an example implementation of the power supply 1. Further, according to at least one example embodiment, any element that generates power may be used by the e-vaping device 60 as the power supply 1.

Further, as is functionally illustrated in FIG. 1B by the "ON" and "OFF" connections, the controller 102 may control the vaporizer 111 by switching the power delivered from the battery to the vaporizer 111 between on and off states. The vaporizer 111 may generate heat when the power is switched on and may cease to generate heat when the power is switched off. The battery 1 may be included in a separate/removable assembly (e.g., the second section 72) as is illustrated in FIG. 1A. According to at least one example embodiment, the second section 72 may include one or more electronic circuits that may generate control signals, communicate with the first section 70, and may also control the power delivered to the vaporizer 111. As will be discussed in greater detail below with reference to FIGS. 3A-3F, according to at last one example embodiment, the puff sensor 16 may be implemented by one or more electronic chips which communicate with the controller 102 or directly with the cartomizer 113. As will be discussed in greater detail below with reference to FIGS. 3A-3E, the second section 72 including the battery 1 may be electrically connected with the cartomizer 113 (the first section 70), and the cartomizer 113 can be replaced or changed (e.g. when a new/different e-Liquid is desired). As used in the present disclosure, the term "cartomizer 113" is used interchangeably with the term "first section 70".

As will also be discussed in greater detail below with reference to FIGS. 3A-3E, the e-vaping device 60 may include one or more memory chips (e.g., integrated circuits implementing memory device 220) located, for example, in the cartomizer 113 (the first section 70). According to at least one example embodiment, the memory device 220 may be embodied as a memory chip (e.g., an integrated circuit). According to at least one example embodiment, the memory device 220 may be embodied as a memory device including multiple individual memory chips. The memory device 220 may store cartomizer information.

The term "cartomizer information", as used herein, may refer to any information about the cartomizer 113 or the e-vaping device 60, or any other useful information to carry on board the cartridge, including, for example, usage data corresponding to the cartomizer 113 and/or e-vaping device 60, information on an age of the cartomizer 113 and/or e-vaping device 60, and e-liquid information corresponding to the cartomizer 113 and/or e-vaping device 60.

The usage data included in the cartomizer information stored in the memory device 220 of the e-vaping device 60 may include any information regarding an amount of usage of the cartomizer 113 and/or e-vaping device 60. The memory device 220 may include an identity of the cartomizer 113, and gather usage data corresponding to the cartomizer 113 during the usage of the cartomizer 113. Examples of the usage data included in the cartomizer information stored in the memory device 220 of the e-vaping device 60 include a total number of cycles of activating/deactivating the heating element, and an accumulated amount of time the vaporizer 111 has been in an activated state.

Examples of the age information stored in the memory device 220 of the e-vaping device 60 include, for example, a date the cartomizer 113 and/or the e-vaping device 60 and/or was manufactured, and a date the cartomizer 113 and/or e-vaping device 60 was first activated.

The e-liquid information included in the cartomizer information stored in the memory device 220 of the e-vaping device 60 may include any information regarding a type and/or amount of e-liquid initially and/or presently included in the cartomizer 113 and/or e-vaping device 60. For example, the e-liquid information included in the cartomizer information may include measurements or estimates of an amount of e-liquid in the cartomizer 113 and/or the e-vaping device 60. In at least one embodiment, the amount of e-liquid in the cartomizer 113 (or an estimate of an amount of e-liquid in the cartomizer 113) may be determined, stored and tracked by the memory device 220. For example, the memory device 220 included in the cartomizer 113 may implement the function of estimating an amount of e-liquid 110 left in the cartomizer 113 based on one or all of the above-referenced cartomizer information. This e-liquid amount estimation may be used to predict and prevent (e.g.

by shutting down, electronically, the power delivered to the vaporizer 111 and/or notifying the adult vaper) burning that may occur after the e-liquid in the cartomizer 113 is empty or nearly empty. For example, the memory device 220 may store an estimation of the amount of e-liquid 110 fluid left in the cartomizer 113 along with identifying the type of the cartomizer 113, the amount of time it has been left on the shelf before buying, etc. Based on this information, the e-vaping device 60 may cease the heating of the vaporizer 111 when the e-liquid 110 is exhausted or falls below a desired level.

As will be discussed in greater detail below with reference to FIGS. 3A-3E, signals may be communicated between the first section 70 and second section 72 of the e-vaping device 60 using a connector connecting the first and second sections 70 and 72. The simplified connector 210/215 may only include two wires. For example, the connector connecting the first and second sections 70 and 72 may include a first connecter 210 corresponding to the first section 70 and a second connector 215 corresponding to the second section 72. The first and second connectors 210 and 215 may connect together to form an electrical connection between the first and second sections 70 and 72. In one embodiment, the same set of two wires that are used to transfer high capacity power to energize the heating coil may be used to communicate with the memory device 220 that may be present on board the cartomizer 113.

Example wiring structures of portions of the first and second sections 70 and 72 of the e-vaping device 60 will now be discussed in greater detail below with reference to FIGS. 3A-3E. Further, an example method of operating the e-vaping device 60 will be discussed with reference to FIG. 3F.

Figure 3A:
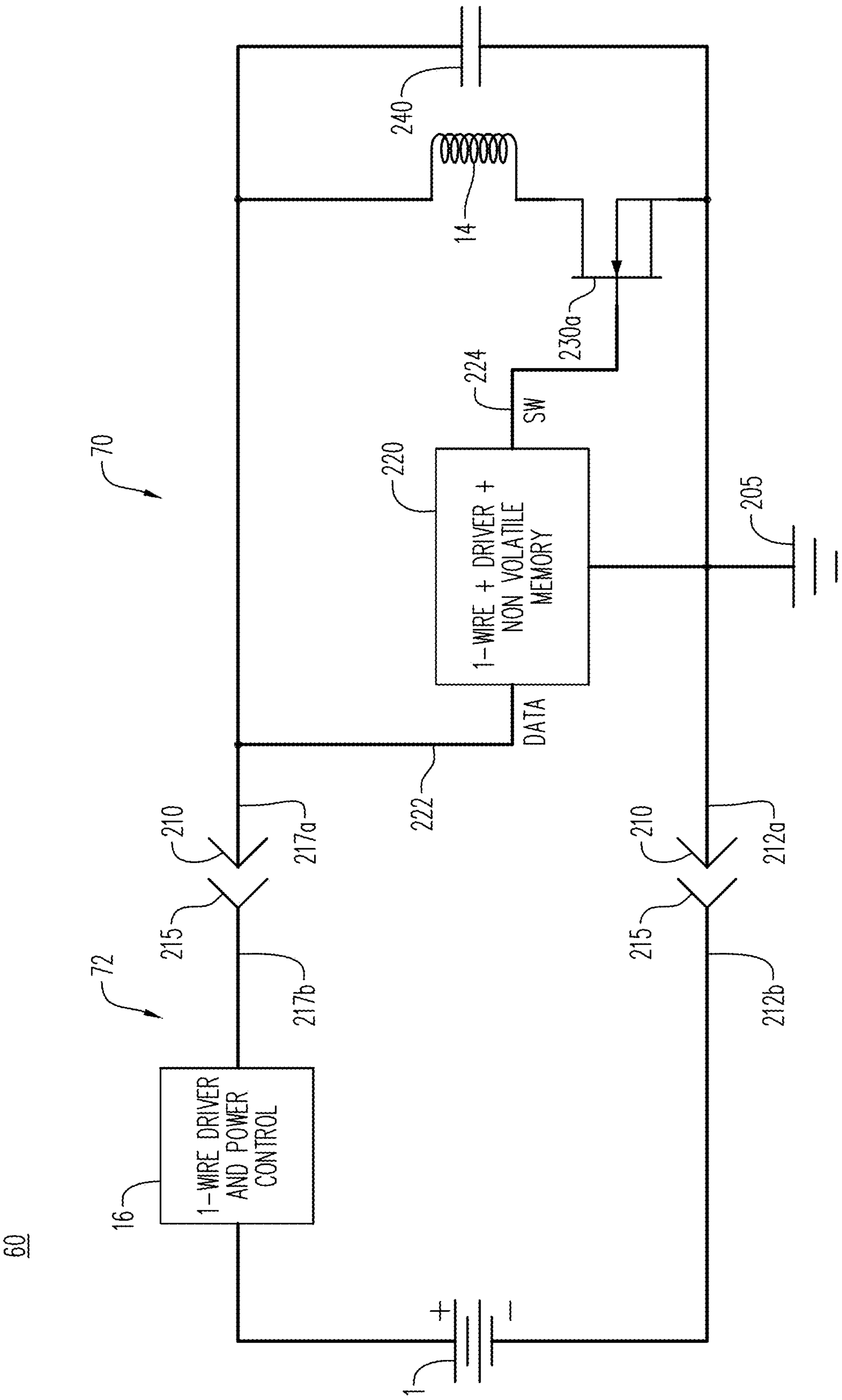
FIG. 3A is a circuit diagram of an e-vaping device that includes a one wire chip according to at least one example embodiment.

FIG. 3A is a diagram of an electronic circuit of an e-vaping device with a one wire chip on board the cartomizer according to at least one example embodiment. FIG. 3A illustrates an example circuit diagram of the e-vaping device 60 with a first section 70 and the second section 72. The first section 70 (the cartomizer side) includes the heating coil 14, which is an example of the vaporizer 111, for vaporizing the e-liquid 110. The second section 72 (the battery side) includes the puff sensor 16. In the embodiment shown in FIG. 3A, the puff sensor 16 implements a one-wire driver and power control functionality for providing power to the heating coil 14.

According to at least one example embodiment, the puff sensor 16 may use pulse width modulation (PWM) to generate and control the amount of power delivered by the power signal to the heating coil 14, and thus control the heating coil temperature in response to the puff detector 16 detecting inhalation by an adult vaper. As is illustrated in FIG. 3A, the first section 70 may also include a first capacitor 240. The capacitor 240 may be, for example connected in parallel to the resistor 14 and a first switch 230A.

As is illustrated in FIG. 3A, the first section 70 includes the memory device 220. In the embodiment shown in FIG. 3A, the memory device 220 operates as a one-wire chip and stores information about the e-vaping device 60 or the cartomizer 113 (e.g., cartomizer information as is discussed above with reference to FIG. 1B). According to at least one example embodiment, the puff sensor 116 may read information stored in the memory device 220. According to at least one example embodiment, the memory device 220 may send data signals indicating the cartomizer information stored in the memory device 220 to the puff sensor 16, for example, in response to control signaling received at the memory device 220 form the puff sensor 16.

The puff sensor 16 may use a particular preamble as part of control signaling intended for the memory device 220. Accordingly, the memory device 220 can differentiate between the control signals intended for the memory device 220 and the PWM power signals intended for the heating coil 14. Consequently, the memory device 220 may avoid treating the PWM power signals as control signals for controlling the operation of the memory device 220. When the puff sensor 16 reads or receives an indication of the cartomizer information stored in the memory device 220, if the cartomizer information stored within the memory device 220 indicates that an amount of e-liquid included the e-vaping device 60 is below a desired level or below a level at which burning in the cartomizer 113 is likely to occur, the puff detector 16 may cease sending the power signals to the heating coil 14, thereby discontinuing the operation of heating up the heating coil 14 and preventing burning in the cartomizer 113. The desired level and the level at which burning in the cartomizer 113 is likely to occur are decision parameters determined through empirical study. As is shown in FIG. 3A, the memory device 220 may be directly connected to ground 250. Further, the memory device 220 may connected to a switch control line 224 and a data line 222, each of which will be discussed in greater detail below.

The term "one-wire", as used herein with reference to e-vaping device 60, does not refer to the number of connections between the battery 1 and the cartomizer 113. The one-wire terminology refers to the ability of e-vaping device 60 to use the same line, for example the first connector VDD line 217A, to (i) send a power signal (e.g., the PWM power signal for powering the heating coil 14), send (ii) data between the first and second sections 70 and 72, and operate as a VDD line for the operation of one or more circuits (e.g., the memory device 220) on board the cartomizer 113. The first connector VDD line 217A is discussed in greater detail below.

One example of a one-wire memory chip that may be included in the memory device 220 is the DS28E05 electrically erasable programmable read-only memory (EEPROM) by MAXIM. In at least one embodiment, the memory device 220 may include both non-volatile memory including, for example, EEPROM. According to at least one example embodiment, the e-vaping device 60 may also include a switching architecture. According to at least one example embodiment, the term "switching architecture" used with reference to the e-vaping device 60 refers to one or more electronic switches (e.g., first switch 230A and/or second switch 230B) that selectively allows or prevent current from flowing through the heating coil 14, as will be discussed in greater detail with reference to FIGS. 3A-3D. According to at least one example embodiment, the term "switching architecture" used with reference to the e-vaping device 60 refers to one or more electronic switches that selectively allow or prevent current from flowing through the heating coil 14, and one or more switch control devices that control the one or more electronic switches. According to at least one example embodiment, the memory device 220 may include one or more electronic switches that selectively allows or prevent current from flowing through the heating coil 14. According to at least one example embodiment, the memory device 220 is an example of a switch control device that controls one or more electronic switches that selectively allows or prevents current from flowing through the heating coil 14. In the examples shown in FIGS. 3A and 3D, at least one electronic switch (e.g., the first switch 230A) connects, or disconnects, the heating coil 14 on the grounded end. Alternatively, in the examples shown in FIGS. 3B and 3C, a least one electronic switch (e.g., the second switch 230B) connects, or disconnects, the heating coil 14 on the power supply VDD end.

In at least one embodiment, the memory device 220 tracks the usage and remaining amount of the e-liquid 110 to prevent burning in the first section 70 (i.e., to prevent heating of the heating coil when the e-liquid 110 is depleted, which may result in burning in the cartomizer 113). As is illustrated in FIG. 3A, the memory device 220 may be connected to, and powered by, the same wire or wires used for powering up the heating coil 14, via a first connector ground line 212A, a second connector ground line 212B, a first connector VDD line 217A, and a second connecter VDD line 217B.

As is illustrated in FIG. 3A, the first and second connectors 210 and 215 provide an electrical connection between the first and second sections 70 and 72. As is illustrated in FIG. 3A, on the first section 70, the first connector ground line 212A may serve as the connection of the ground line 205 to the second connecter ground line 212B, which may be connected to an anode of the battery 1. As is also illustrated in FIG. 3A, the first connector VDD line 217A may be connected through the second connecter VDD line 217B to the puff sensor 16. The first and second connectors 210 and 215, the first connector ground line 212A, the second connector ground line 212B, the first connector VDD line 217A, and the second connecter VDD line 217B may be implemented by any known element or device capable of electrically connecting portions of a circuit together including, for example, conductive (e.g., metal) leads that are configured to contact one another when the first and second sections 70 and 72 of the e-vaping device 60 are attached to each other.

As is illustrated in FIG. 3A, the memory device 220 uses the same wires (i.e., the first connector ground line 212A, the second connector ground line 212B, the first connector VDD line 217A, and the second connecter VDD line 217B) to receive power from, and communicate with, the second section 72. According to at least one example embodiment, the first section 70 may include the first switch 230A, and the first switch 230A may be connected in between the heating coil 14 and the first connector ground line 212A. As is illustrated in FIG. 3A, a control node of the first switch 230A may be connected, via the switch control line 224, to the memory device 220. Accordingly, the memory device 220 can send a signal to the control node of the first switch 230A via the switch control line 224 in order to control the first switch 230A to electrically disconnect the heating coil 14 from the data/power lines (i.e., to prevent the heating coil 14 from receiving a current from either of first connector ground and VDD lines 212A and 217A) when the memory device 220 communicates with the second section 72.

For example, the first switch 230A may be a field effect transistor (FET), examples of which include metal-oxide-semiconductor FETs (MOSFETs). The first switch 230A can prevent the heating coil 14 from behaving similar to a short circuit when the memory device 220 sends data, via the data line 222, to control circuitry in the second section 72 (e.g., the flow sensor 16), by blocking an electrical connection between the first connector ground line 212A and the heating coil 14, thus preventing current from flowing through the heating coil 14.

For example, when the puff sensor 16 sends the PWM power signal to the heating coil 14 to cause the heating coil 14 to heat up, the first capacitor 240 may store charge from the PWM power signal, for example while the heating coil 14 heats up. Afterwards, the memory device 220 may be powered by the charge stored in the first capacitor 240. For example, the memory device 220 may use the charge stored in the first capacitor 240 to send data to the second section 72, for example via the data line 222 connected between the memory device 220 and the first connector VDD line 217A.

However, according to at least some example embodiments, the amount of charge stored in the capacitor 240 may be limited. Further, the heating coil 14, acting as a short circuit, may significantly reduce the strength (e.g., current) of a data signal sent from the memory device 220 to the second section 72. Accordingly, if the heating coil 14 is not prevented from acting as a short circuit when the memory device 220 attempts to send data to the second section 72, it is possible that the amount of charge included in the capacitor 240 may not be sufficient to allow the memory device 220 to form a data signal which is strong enough for the puff sensor 16, or other control circuitry on the second section 72, to read reliably. Accordingly, as is discussed above, the first switch 230A is controlled, for example by the memory device 220, to prevent the heating coil 14 from acting as a short circuit when the memory device 220 sends data to the second section 72, so data signals sent from the memory device 220 to the second section 72 may have sufficient strength to be read reliably by control circuitry on the second section 72.

Additionally, an appropriate pull-up resistor (not shown) may be placed on the puff sensor 16, for further facilitating the operation of the memory device 220 sending readable response signaling to the puff sensory 16.

According to at least one example embodiment, the switch 230A may be embedded in the memory device 220 itself, saving the space consumed by an external package. The memory device 220 may include other functional blocks, including, for example, an analog-to-digital converter (ADC), that may facilitate various measurements (e.g. temperature).

Figure 3B:
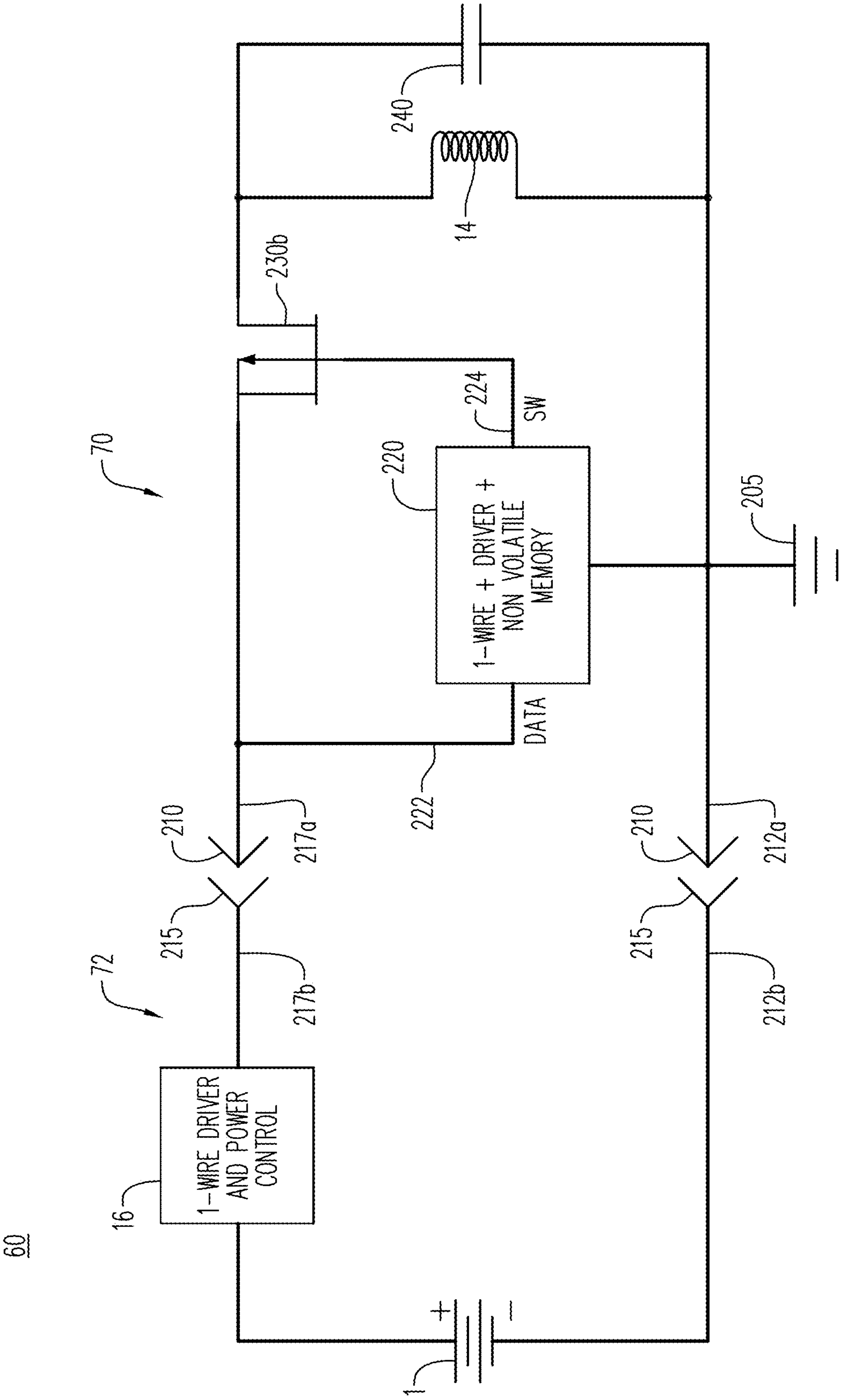
FIG. 3B is a circuit diagram of an e-vaping device that includes a one wire chip according to at least one example embodiment.

FIG. 3B is a diagram of another embodiment of the e-vaping device 60 with the memory device 220 implemented as a one-wire chip. The example illustrated in FIG. 3B includes a second switch 230B. The second switch 230B may have the same structure and operation as that described above with respect to the first switch 230A, with the exception that the second switch 230B may be located in a different location from that of the first switch 230A of FIG. 3A. For example, the second switch 230B may be positioned on the first connector VDD line 217A in between the first connector 210 and the heating coil 14. Accordingly, the second switch 230B may be positioned so as to prevent an electrical connection between the heating coil 14 and the first connector VDD line 217A, instead of preventing an electrical connection between the heating coil 14 and the first connector ground line 212A, as does the first switch 230A.

Similar to the example shown in of FIG. 3A, the second switch 230B may be a FET (e.g., MOSFET) switch. Further, the memory device 220 controls the second switch 230B to electrically disconnect that coil 14 from the first connector VDD line 217A, in order to prevent the second switch 230B from acting as a short circuit when the memory device 220 sends data, thereby allowing the memory device 220 to send data signals to the second section 72 which are strong enough to be read reliably by control circuitry on the second section 72.

Similar to the embodiment of FIG. 3A, the second switch 230B may be embedded in the memory device 220. For example, the second switch 230B may be embedded in the memory device 220 along with other functional blocks for allowing various measurements (e.g. temperature).

Accordingly, in the example shown in FIG. 3B, the e-vaping device 60 may include the same structure and function discussed above with respect to the example of the e-vaping device 60 shown in FIG. 3A with the exception that the second switch 230B connected in between the heating coil 14 and the first connector VDD line 217A is included instead of the first switch 230A connected in between the heating coil 14 and the first connector ground line 212A.

According to at least one example embodiment, an electrical switch may be placed at a location other than those locations shown in FIGS. 3A and 3B with respect to first and second switches 230A and 230B. For example, according to one or more example embodiments, an electrical switch may be placed at any location within the e-vaping device 60 as long as the location allows the electrical switch to be capable of preventing the heating coil 14 from acting as a short circuit and reducing a strength of data signals sent from the memory device 220 to the second section 72. For example, an electrical switch may be placed at any location within the e-vaping device that allows the electrical switch to be capable of electrically connecting and disconnecting the heating coil 14 from at least one or the power supply VDD (e.g., the battery 1) and the ground line 205.

In the example illustrated in FIG. 3B, the first switch 230A is placed on the power supply VDD end as opposed to the grounded end, as is shown with respect to the second switch 230B in FIG. 3B. However, according to at least one example embodiment, the e-vaping device 60 shown in the examples in either of FIGS. 3A and 3B may simultaneously include both the first and second switches 230A and 230B.

Figure 3C:
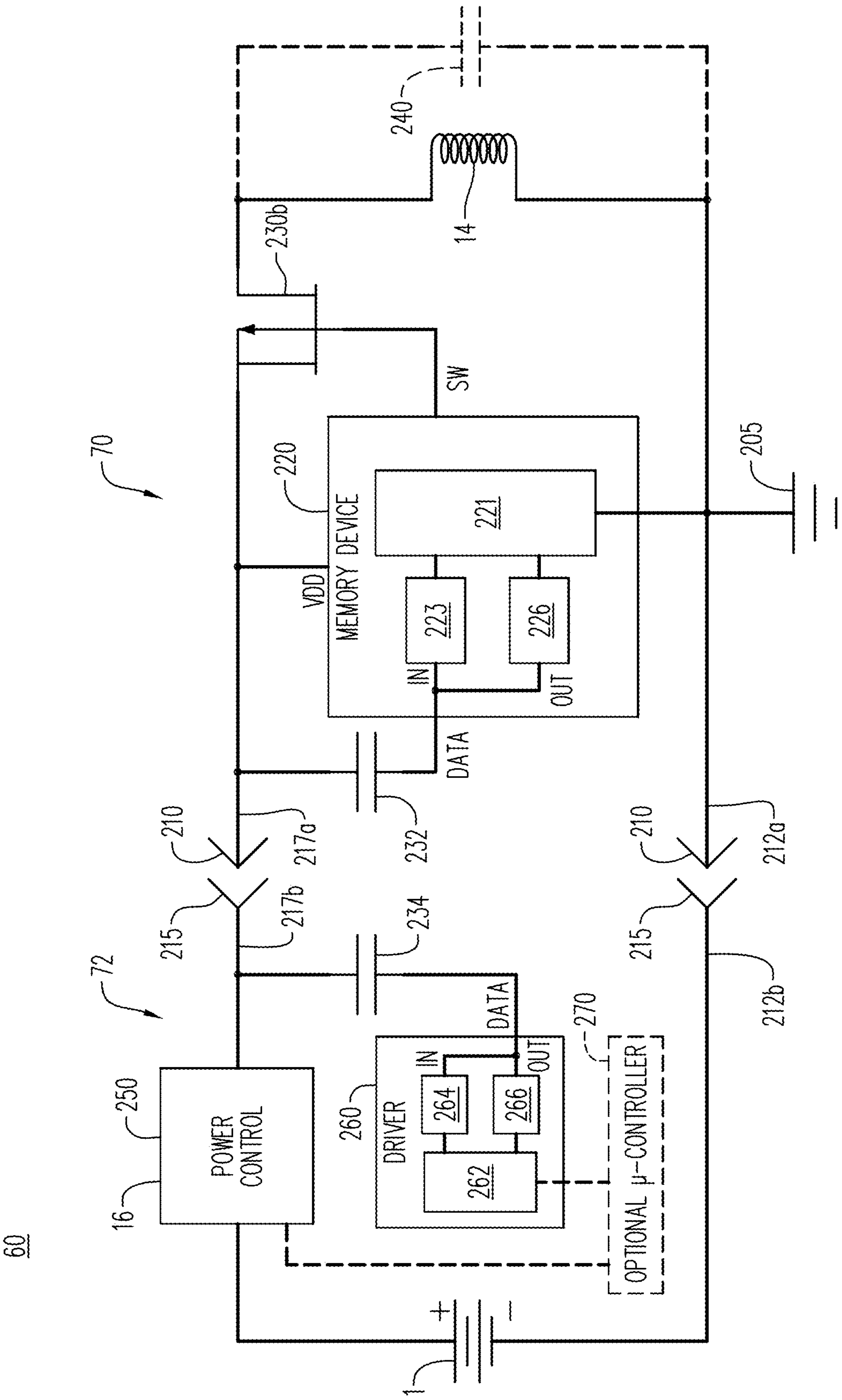
FIG. 3C is a circuit diagram of an e-vaping device that implements bidirectional communication according to at least one example embodiment.
Figure 3D:
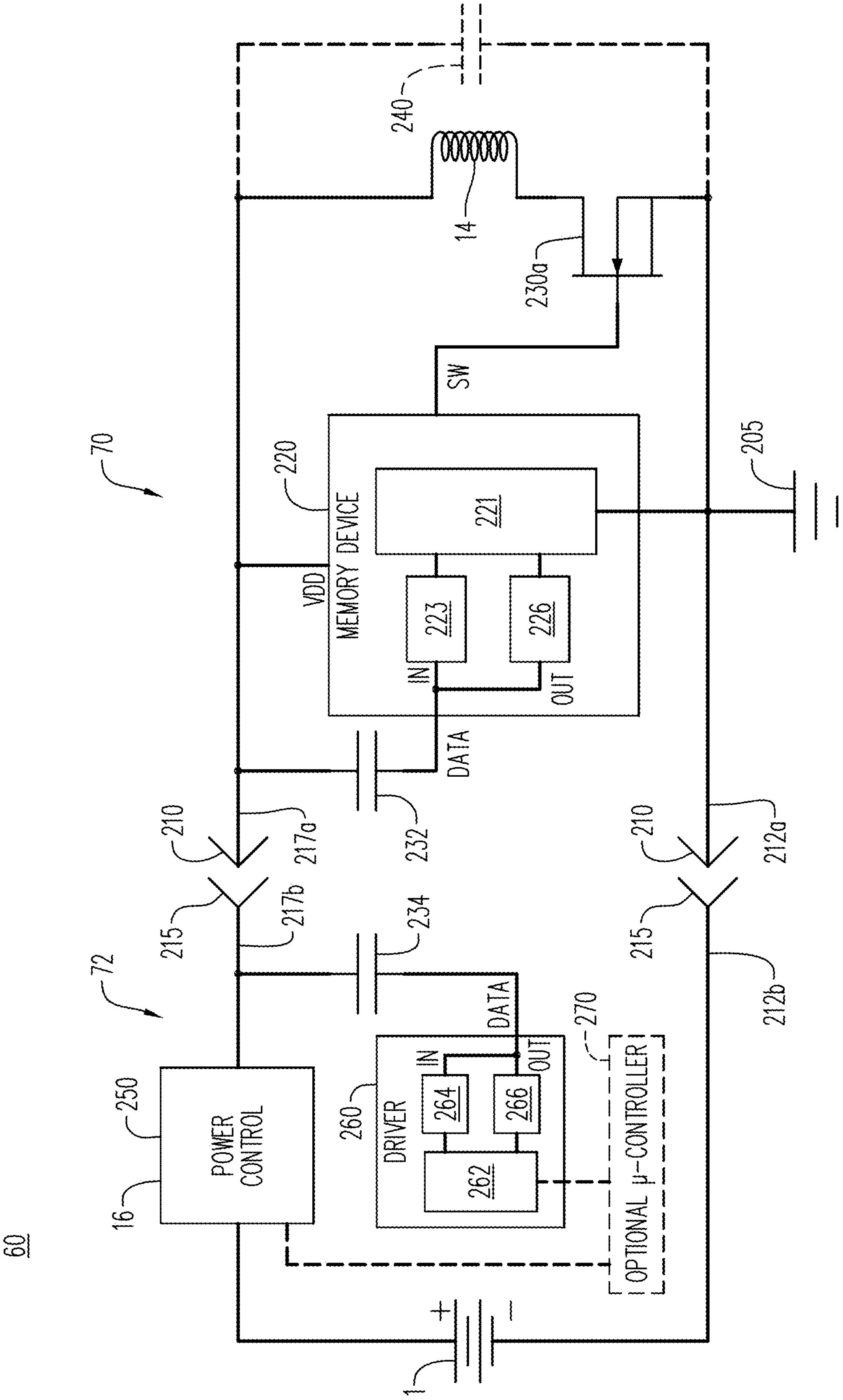
FIG. 3D is a circuit diagram of an e-vaping device that implements bidirectional communication according to at least one example embodiment.

FIG. 3C is a diagram of an embodiment of an e-vaping device with RF based wire communication for data transfer. FIG. 3D illustrates an alternative embodiment for RF based communication between the first and second sections 70 and 72. The example embodiment of the e-vaping device 60 shown in FIG. 3C may utilize high frequency modulation on the VDD supply signal. Referring to FIG. 3C, the memory device 220 may include a circuit block 221. The circuit block 221 may be configured to implement a front end device that supports communications with the second section 72 using a desired protocol including, for example, an RF based implementation of $I^2C$ protocol or a similar protocol. The circuit block 221 may also include a non-volatile memory. Further, the memory device 220 may also include a first RF demodulator 223 on an input line of the memory device 220, and a first RF modulator 226 on an output line of the memory device 220. As compared with the embodiments in FIGS. 3A and 3B, the examples illustrated in FIGS. 3C and 3D may be more desirable for faster signals.

Referring to FIG. 3C, in the example shown in FIG. 3C, the memory device 220 may include an enhanced ability to handle variations of the VDD supply. The enhanced ability to handle variations of the VDD supply may be used support additional communication protocols for (bidirectional) data transfer between the memory device 220 and the second section 72.

In the example shown in FIG. 3C, the puff sensor 16 may include power control circuit 250 configured to control the supply of power to the heating coil 14 and a driver circuit 260. Further, according to at least some example embodiments, the puff sensor 16 may optionally include a microcontroller 270 for controlling the power control circuit 250 and/or the driver circuit 260. The driver circuit 260 may include a front end circuit 262. Similar to the circuit block 221, the front end circuit 262 may support communications with the first section 70 using a desired protocol including, for example, the RF based $I^2C$ protocol or a similar protocol. The driver circuit 260 may also include a second RF demodulator 264 on an input line of the driver circuit 260, and a second RF modulator 266 on an output line of the memory device 220.

On each side of the e-vaping device 60, isolation capacitors (e.g., a first isolation capacitor 232 and a second isolation capacitor 234) may be connected to the first connector VDD line 217A for allowing the RF signal only to pass to the input RF circuitry. Further, the first isolation capacitor 232 may also be connected to the first RF demodulator 223 and the first RF modulator 226, and the second isolation capacitor 234 may also be connected to the second RF demodulator 264 and the second output RF modulator 266. The first and second RF modulators 226 and 266 generate RF signal modulation on the voltage line. According to at least one example embodiment, RF modulation may be applied in an originating section of the e-vaping device 60 (i.e., the first section 70 or the second section 72) using the RF modulator of the originating section (e.g., the first RF modulator 226 or the second RF modulator 266), such that the RF signal passes through one of the isolation capacitor of the originating section (e.g., the first or second isolation capacitors 232 or 234), where the RF signal is low in comparison to the VDD itself (e.g., for VDD of 3V-4.5V the modulation can be of +/−0.5V). Further, at the receiving section (e.g., the second section 72 or the first section 70) the RF signal passes the isolation capacitor of the receiving section of the e-vaping device 60, and is given to the input end of the RF demodulator of the receiving section (e.g., the second or first RF demodulator 264 or 223).

The output of the digitizer of the receiving section is passed to the protocol logic of the receiving section (e.g., the front end circuit 262 or the circuit block 221). As is illustrated in FIG. 3C, the second switch 230B may be connected in between the first connector VDD line 217A and the heating coil 14 in the same manner described above with reference to FIG. 3B. Unlike the one-wire chip, a preamble on each command is not needed in the protocol as the PWM is far slower than any RF based channel, and may be considered orthogonal. In the first section 70, the protocol logic (circuit block 221) may control the second switch 230B and the non-volatile memory included in the circuit block 221. According to at least one example embodiment, the second switch 230B may reside inside the memory device 220. Further, other circuits may be added to the memory device 220 for various purposes (e.g. circuitry for temperature measurement).

Further, in the same manner discussed above with respect to FIGS. 3A and 3B, the puff sensor 16 may control the coil to heat up by sending PWM power signals to the heating coil 14 in response to detecting inhalation by an adult vaper, and the first capacitor 240 may store charge from the PWM power signals. Further, the memory device 220 may be powered by the charge stored in the first capacitor 240. Further, the memory device 220 may control the second switch 230B to prevent the heating coil 14 from acting as a short circuit when the memory device 220 sends data to the control circuitry in the second section 70 (including, for example, the puff sensor 16) such that a strength of the data signals sent from the memory device 220 is high enough for the circuitry in the second section 72 to reliably read the data signals.

Further, in the same manner discussed above with respect to FIGS. 3A and 3B, when the puff sensor 16 reads or receives an indication of the cartomizer information stored in the memory device 220, if the cartomizer information stored within the memory device 220 indicates that an amount of e-liquid included the e-vaping device 60 is below a desired level or below level at which burning in the cartomizer 113 is likely to occur, the puff detector 16 may cease sending the power signals to the heating coil 14, thereby discontinuing the operation of heating up the heating coil 14 and preventing burning in the cartomizer 113.

FIG. 3D is a diagram of another embodiment of an e-vaping device with bidirectional wire communication. The embodiment in FIG. 3D includes an electronic switch in a different location from that shown in FIG. 3C. Accordingly, in the example shown in FIG. 3D, the e-vaping device 60 may include the same structure and function discussed above with respect to the example of the e-vaping device 60 shown in FIG. 3C with the exception that the first switch 230A connected in between the heating coil 14 and the first connector ground line 212A is included instead of the second switch 230B connected in between the heating coil 14 and the first connector VDD line 217A.

Further, according to at least one example embodiment, in either of the examples shown in FIGS. 3C and 3D, the e-vaping device 60 may include both the first switch 230A and the second switch 230D.

Figure 3E:
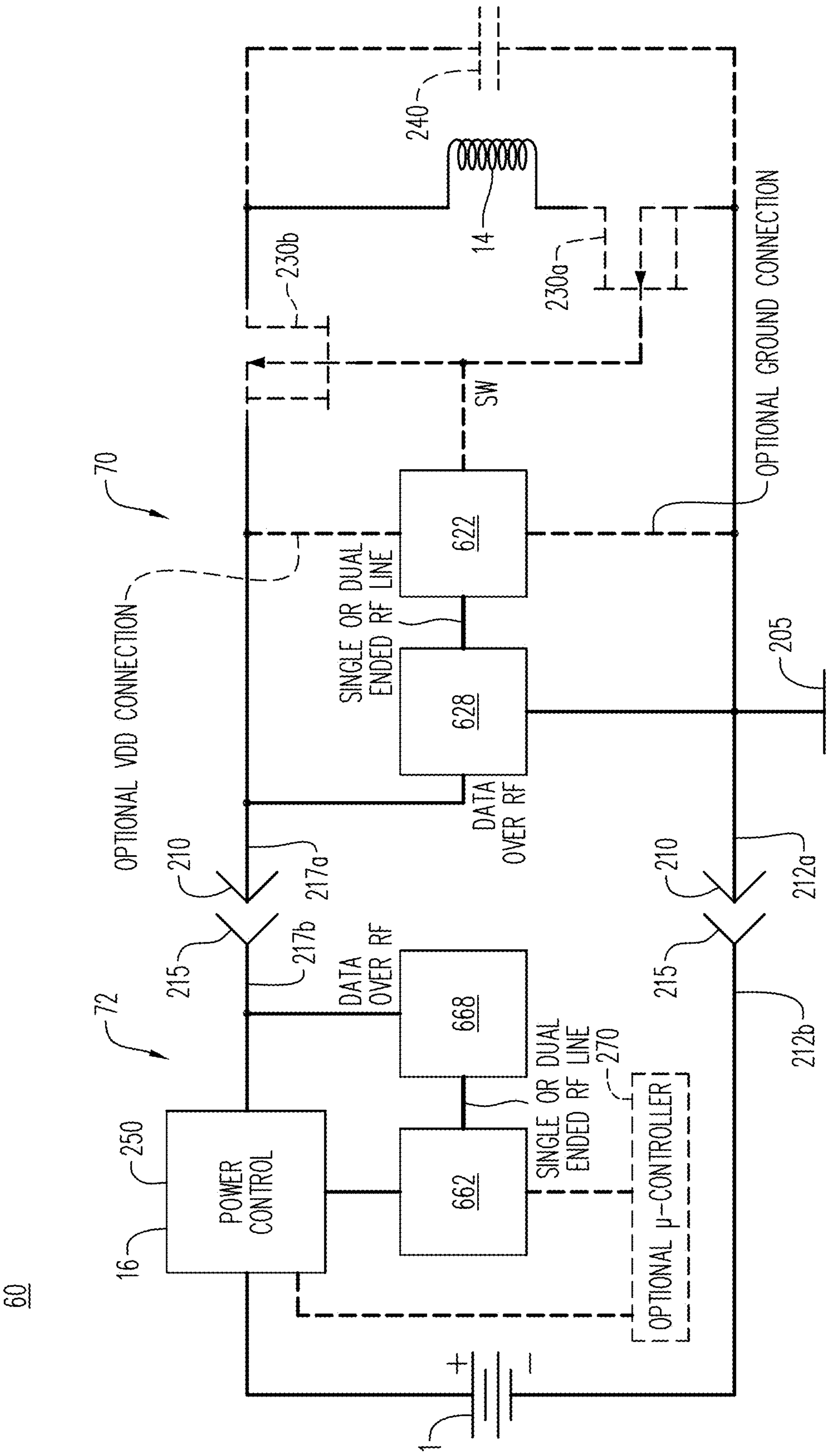
FIG. 3E is a circuit diagram of an e-vaping device that implements RF communication according to at least one example embodiment.

FIG. 3E is a diagram of an embodiment of an e-vaping device 60 that implements radio frequency (RF) communication. FIG. 3E illustrates an example of an embodiment of the e-vaping circuit 60 that implements bidirectional communication between the first and second sections 70 and 72 using RF technology. As is illustrated in FIG. 3E, the e-vaping device still includes a memory chip 622. The memory chip 622 includes a non-volatile memory and is configured to implement an RF front end device that supports RF communication. Accordingly, information stored in the memory chip 622 is communicated using RF technology. In at least one embodiment, the memory chip 622 may include a near filed communication (NFC) tag which may be used by or serve as the memory chip 622 to communicate data to the second section 72. The memory chip may be connected to a first electromagnetic compatibility (EMC) circuit 628, which will be discussed in greater detail below. According to at least one example embodiment, the memory chip 622 may be embodied as a memory device including multiple individual chips.

Further, the e-vaping device 60 may include one or both of the first and second switches 230A and 230B. Further, the memory chip 622 may be connected to control nodes of one or both of the first and second switches 230A and 230B such that the memory chip 622 can control the first and/or second switches 230A and 230B to connect or disconnect the heating coil 14 from one or both of the first connector VDD line 217A and the first connector ground line 212A when the memory chip 622 sends data to the second section 72.

In the example shown in FIG. 3E, the puff sensor 16 may include power control circuit 250 configured to control the supply of power to the heating coil 14, a first RF front end circuit 662, and a second EMC circuit 668. Further, according to at least some example embodiments, the puff sensor 16 may optionally include a microcontroller 270 for controlling the power control circuit 250, RF front end circuit 662, and second EMC circuit 668.

The first and second EMC circuits 628 and 668 may be used to facilitate RF communication between circuitry in the first and second sections 70 and 72. According to at least one example embodiment, each of the first and second EMC circuits 628 and 668 may be, include, or implement a balun. Use of the first and second EMC circuits 628 and 668 in the respective first and second sections 70 and 72 may help ensure that the RF front ends of the first and second sections 70 and 72 (i.e., the RF front end implemented by the memory chip 622 and RF front end circuit 662) are not influenced by the low resistance of the heating coil 14.

According to at least some example embodiments, single ended or differential RF technologies may be used for the RF front ends of the first and second sections 70 and 72. As in the previous embodiments, one or both of the first and second switches 230A and 230B may be incorporated in the memory device 220, and may reside inside the memory device 220 itself. However, according to at least one example embodiment, when the switches 230A and 230B are not included in the e-vaping device 60, there may be an advantage of allowing communication with the memory chip 622 during the smoking operation. For example, the memory chip 622 may include either an NFC tag, or a radio frequency identification (RFID) tag, and the second section 72 may include one or both of an NFC and RFID reader for reading information from the NFC or RFID tag in the memory chip 622.

Further, in a manner similar to that discussed above with respect to FIGS. 3A-3D, the puff sensor 16 may control the heating coil 14 to heat up by sending PWM power signals to the heating coil 14 in response to detecting inhalation by an adult vaper, and the first capacitor 240 may store charge from the PWM power signals. Further, the memory chip 622 may be powered by the charge stored in the first capacitor 240. Further, the memory chip 622 may control one or both of the first and second switches 230A and 230B to prevent the heating coil 14 from acting as a short circuit when the memory device 220 sends data to the control circuitry in the second section 70 (including, for example, the puff sensor 16) such that a strength of the data signals sent from the memory device 220 is high enough for the circuitry in the second section 72 to reliably read the data signals.

Further, according to at least one example embodiment, even if neither of the first and second switches 230A and 230B are included in the e-vaping device 60 in the example shown in FIG. 3E, and the heating coil 14 acts as a short circuit, the memory chip 622 may still be capable of sending data signals to the second section 72 with signal strength sufficient for circuitry in the second section 72 to read the data signals reliably, due to the ability of the first and second EMC circuits 628 and 668 to correct RF signals.

Further, in a manner similar to that discussed above with respect to FIGS. 3A-3D, when the puff sensor 16 reads or receives an indication of the cartomizer information stored in the memory chip 622, if the cartomizer information stored within the memory chip 622 indicates that an amount of e-liquid included the e-vaping device 60 is below a desired level or below level at which burning in the cartomizer 113 is likely to occur, the puff detector 16 may cease sending the power signals to the heating coil 14, thereby discontinuing the operation of heating up the heating coil 14 and preventing burning in the cartomizer 113.

Figure 3F:
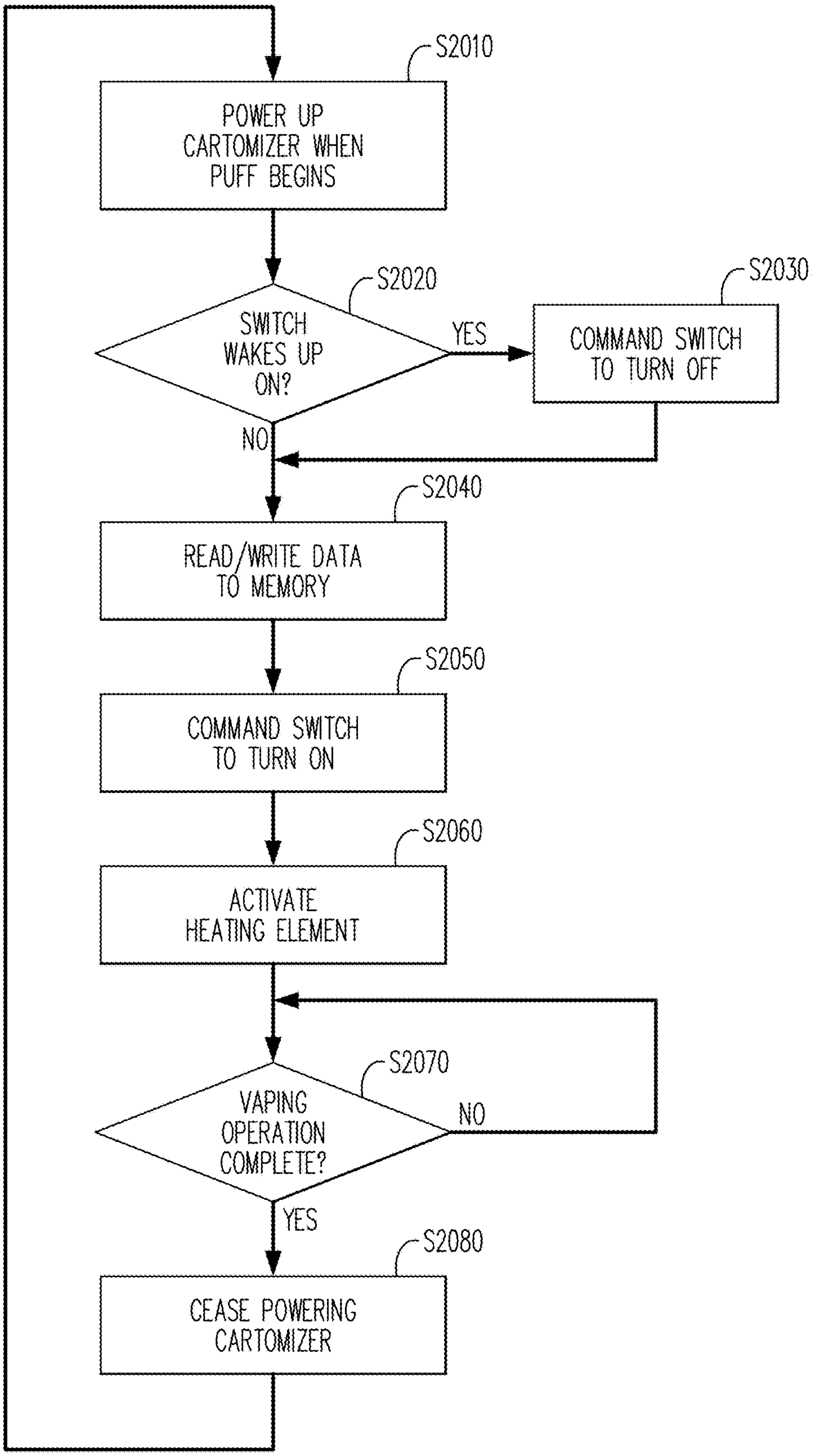
FIG. 3F is flowchart explaining an example method of operating the e-vaping device.

An example method of operating the e-vaping device 60 will now be discussed below with reference to FIG. 3F. FIG. 3F is flowchart explaining an example method of operating the e-vaping device 60. For the purpose of simplicity, the example below will be explained primarily with reference to the e-vaping device 60, puff sensor 16, and memory device 220 included in FIGS. 3A-3D. However, the steps described below may also be performed by the e-vaping device 60 shown in FIG. 3E. For example, operations described as being performed by and/or on the memory device 220 may also be performed by and/or on the memory chip 622 illustrated in FIG. 3E.

Referring to FIG. 3F, before the beginning of each puff cycle of the e-vaping device 60, the cartomizer 113 is powered off by the second section 72. For example, the puff sensor 16 may prevent power from flowing from the battery 1 to the first section 70 at the end of each puff cycle, for example, by controlling (e.g., opening or closing) a path via which power flows from the battery 1.

In step S2010, when a puff is detected, the second section 72 sends power to the first section 70, thereby powering up the cartomizer 113. For example, the puff sensor 16 may allow power to flow from the battery 1 to the first section 70, for example, by controlling the battery 1 or a path via which power flows from the battery 1, when the puff sensors 16 determines a pressure drop in the e-vaping device 60 indicating that an inhalation by a an adult vaper has begun.

In step S2020, if the electronic switch is determined to have woken up in the "ON" state, the e-vaping device 60 proceeds to step S2030. The term "electronic switch" as used herein in the description of FIG. 3F refers to one or more electronic switches controlling the ability of the heating coil 14 to receive a current, examples of which include the first switch 230A and/or the second switch 230B discussed above with reference to FIGS. 3A-3E. According to at least one example embodiment, the memory device 220 controls the first switch 230A and/or the second switch 230B. Further, according to at least one example embodiment, the puff sensor 16 controls the memory device 220. Consequently, according to at least one example embodiment, in step S2020, the memory device 220 may determine a state of the one or more electronic switches based on a value of a control signal, or control signals, being sent from the memory device 220 to the one or more electronic switches. Further, according to at least one example embodiment, in step S2020, the puff sensor 16 may determine a state of the one or more electronic switches based on a value of a command, or commands, sent from the puff sensor 16 to the memory device 220 to the one or more electronic switches and/or or a response to the command or commands received at the puff sensor 16 from the memory device 220.

In step S2030, the e-vaping device 60 controls the electronic switch to transition to the "OFF" state, where an "OFF" state refers to a state in which the electronic switch prevents current from flowing through heating coil 14, for example, by disconnecting the heating coil 14 from at least one of the first connector VDD line 217A and the first connector ground line 212A, as is discussed above with reference to FIGS. 3A-3E. According to at least one example embodiment, in step S2030, the puff sensor 16 controls the memory device 220 to send a signal via the switch control line 224 to the control node of the electronic switch. According to at least one example embodiment, the memory device 220 can determine the state of the electronic switch, and in step S2030, based on the determination by the memory device 220, the memory device 220 sends a signal via the switch control line 224 to the control node of the electronic switch. The e-vaping device 60 then proceeds to step S2040.

Returning to step S2020, if the electronic switch is not determined by the e-vaping device 60 to have woken up in the "ON" state (e.g., the electronic switch is determined to have woken up in the "OFF" state), the e-vaping device 60 proceeds to step S2040.

In step S2040, the e-vaping device 60 (e.g., the puff sensor 16) may write data to, or read data from, the memory device

220. For example, while the electronic switch is in an "OFF" state thus preventing the heating coil from acting as a short circuit and allowing data signals from traveling successfully from the memory device 220 to the puff sensor 16, the puff sensor 16 may receive data from the memory device 220 indicating the cartomizer information stored in the memory device 220. The e-vaping device 60 then proceeds to step S2050.

In step S2050, the e-vaping device 60 (e.g., the puff sensor 16) commands the electronic switch to turn on, thus placing the e-vaping device 60 in a state where current can flow through the heating coil 14. The e-vaping device 60 then proceeds to step S2060.

In step S2060, the e-vaping device 60 activates the heating element. For example, in step S2060, the puff sensor 16 may send a PWM power signal to the heating coil 14 thus causing the heating coil 14 to heat up, for example, in the manner discussed above with reference to FIGS. 3A-3E. For example, the PWM power signal may be sent in a manner that allows the memory device 220 to determining the PWM power signal is not a control signal intended for the memory device 220 by using, for example, one or more signal preambles that distinguish control signals (e.g., control data packets) intended for the memory device 220 from PWM power signals intended to cause the heating coil to heat up. The e-vaping device 60 then proceeds to step S2070.

In step S2070, the e-vaping device 60 determines whether or not the a vaping operation is complete. For example, the puff sensor 16 may determine whether or not the movement of air through the e-vaping device 60 indicating an inhalation by an adult vaper using the e-vaping device 60 has completed. Once the e-vaping device 60 determines the vaping operation is complete, the e-vaping device proceeds to step S2080.

In step S2080, the e-vaping device 60 ceases providing power to the cartomizer 113. For example, in step S2080, the puff sensor 16 may prevent power from flowing from the battery 1 to the first section 70 by controlling the battery 1 or a path via which power flows from the battery 1.

According to one or more example embodiments, the e-vaping device 60 may include one or more processors, for example, within the puff sensor 16 (e.g., microcontroller 270). Any operations described with reference to FIG. 3F as being performed by the e-vaping device 60 may be performed by (e.g., in response to the control of) the one or more processors included in the e-vaping device 60.

The term "processor", as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

Returning to FIG. 1A, the heater 14 heats liquid in the wick 28 by thermal conduction. Alternatively, heat from the heater 14 may be conducted to the liquid by means of a heat conductive element or the heater 14 may transfer heat to the incoming ambient air that is drawn through the e-vaping device 60 during use, which in turn heats the liquid by convection.

In one embodiment, the wick comprises a ceramic material or ceramic fibers. As noted above, the wick 28 is at least partially surrounded by the heater 14. Moreover, in an embodiment, the wick 28 extends through opposed openings in the inner tube 62 such that end portions 29, 31 of the wick 28 are in contact with the liquid supply reservoir 22.

The wick 28 may comprise a plurality or bundle of filaments. In one embodiment, the filaments may be generally aligned in a direction transverse to the longitudinal direction of the e-vaping device, but the example embodiments are not limited to this orientation. In one embodiment, the structure of the wick 28 is formed of ceramic filaments capable of drawing liquid via capillary action via interstitial spacing between the filaments to the heater 14. The wick 28 can include filaments having a cross-section which is generally cross-shaped, clover-shaped, Y-shaped or in any other suitable shape.

The wick 28 includes any suitable material or combination of materials. Examples of suitable materials are glass filaments and ceramic or graphite based materials or even organic fiber materials like cotton. Moreover, the wick 28 may have any suitable capillarity accommodate aerosol generating liquids having different liquid physical properties such as density, viscosity, surface tension and vapor pressure. The capillary properties of the wick 28, combined with the properties of the liquid, ensure that the wick 28 is always wet in the area of the heater 14 to avoid overheating of the heater 14.

Instead of using a wick, the heater can be a porous material of sufficient capillarity and which incorporates a resistance heater formed of a material having a high electrical resistance capable of generating heat quickly.

In one embodiment, the wick 28 and the fibrous medium 21 of the liquid supply reservoir 22 are constructed from an alumina ceramic. In another embodiment, the wick 28 includes glass fibers and the fibrous medium 21 includes a cellulosic material or polyethylene terephthalate.

In an embodiment, the power supply 1 includes a battery arranged in the e-vaping device 60 such that the anode is downstream of the cathode. A battery anode connector 4 contacts the downstream end of the battery. The heater 14 is connected to the battery by two spaced apart electrical leads 26 (shown in FIGS. 4, 6 and 8).

The connection between the uncoiled, end portions 27, 27' (see FIG. 5) of the heater 14 and the electrical leads 26 are highly conductive and temperature resistant while the heater 14 is highly resistive so that heat generation occurs primarily along the heater 14 and not at the contacts.

The battery may be a Lithium-ion battery or one of its variants, for example a Lithium-ion polymer battery. Alternatively, the battery may be a Nickel-metal hydride battery, a Nickel cadmium battery, a Lithium-manganese battery, a Lithium-cobalt battery or a fuel cell. In that case, the e-vaping device 60 is usable until the energy in the power supply is depleted. Alternatively, the power supply 1 may be rechargeable and include circuitry allowing the battery to be chargeable by an external charging device. In that case, the circuitry, when charged, provides power for a desired (or alternatively a pre-determined) number of puffs, after which the circuitry must be re-connected to an external charging device.

The e-vaping device 60 also includes control circuitry including the puff sensor 16. The puff sensor 16 is operable to sense an air pressure drop and initiate application of voltage from the power supply 1 to the heater 14. The control circuitry can also include a heater activation light 48 operable to glow when the heater 14 is activated. In one embodiment, the heater activation light 48 comprises an LED 48 and is at an upstream end of the e-vaping device 60 so that the heater activation light 48 takes on the appearance of a burning coal during a puff. Moreover, the heater activation light 48 can be arranged to be visible to the adult vaper. In addition, the heater activation light 48 can be utilized for e-vaping system diagnostics. The light 48 can also be configured such that the adult vaper can activate and/or deactivate the light 48 for privacy, such that the light 48 would not activate during vaping if desired. In at least one embodiment, the same light may be used for interface with an adult vaper when the battery is re-charged.

The at least one air inlet 44*a* is located adjacent the puff sensor 16, such that the puff sensor 16 senses air flow indicative of an adult vaper taking a puff and activates the power supply 1 and the heater activation light 48 to indicate that the heater 14 is working.

As is discussed above with reference to FIGS. 3A-3F, control circuits may be is integrated within the puff sensor 16 and may control the supply of power to the heater coil 14 responsive to the puff sensor 16 detecting inhalation of an adult vaper. Accordingly to at least one example embodiment, the power may be supplied to the heater coil 14, for example, with a maximum, time-period limiter.

Alternatively, the control circuitry may include a manually operable switch for an adult vaper to initiate a puff. The time-period of the electric current supply to the heater may be pre-set depending on the amount of liquid desired to be vaporized. The control circuitry may be programmable for this purpose. Alternatively, the circuitry may supply power to the heater as long as the puff sensor detects a pressure drop.

When activated, the heater 14 heats a portion of the wick 28 surrounded by the heater for less than about 10 seconds, more preferably less than about 7 seconds. Thus, the power cycle (or maximum puff length) can range in period from about 2 seconds to about 10 seconds (e.g., about 3 seconds to about 9 seconds, about 4 seconds to about 8 seconds or about 5 seconds to about 7 seconds).

In an embodiment, the liquid supply reservoir 22 includes a liquid storage medium 21 containing liquid material. In the embodiments shown in FIGS. 1A, 1B, 4, 6, 8, 9 and 13, the liquid supply reservoir 22 is contained in an outer annulus 62 between inner tube 62 and outer tube 6 and between stopper 10 and the seal 15. Thus, the liquid supply reservoir 22 at least partially surrounds the central air passage 20 and the heater 14 and the wick 14 extend between portions of the liquid supply reservoir 22. The liquid storage material may be a fibrous material comprising cotton, polyethylene, polyester, rayon and combinations thereof. The fibers may have a diameter ranging in size from about 6 microns to about 15 microns (e.g., about 8 microns to about 12 microns or about 9 microns to about 11 microns). The liquid storage medium 21 may be a sintered, porous or foamed material. Also, the fibers may be sized to be irrespirable and can have a cross-section which has a y shape, cross shape, clover shape or any other suitable shape. In the alternative, the reservoir 22 may comprise a filled tank lacking a fibrous storage medium 21, such as further described with reference to FIGS. 15-17.

Also, the liquid material has a boiling point suitable for use in the e-vaping device 60. If the boiling point is too high, the heater 14 will not be able to vaporize liquid in the wick 28. However, if the boiling point is too low, the liquid may vaporize without the heater 14 being activated.

The liquid material may include a tobacco-containing material including volatile tobacco flavor compounds which are released from the liquid upon heating. The liquid may also be a tobacco flavor containing material or a nicotine-containing material. Alternatively, or in addition, the liquid may include a non-tobacco material. For example, the liquid may include water, solvents, active ingredients, ethanol, plant extracts and natural or artificial flavors. The liquid may further include an aerosol former. Examples of suitable aerosol formers are glycerin, propylene glycol, etc.

Figure 4:
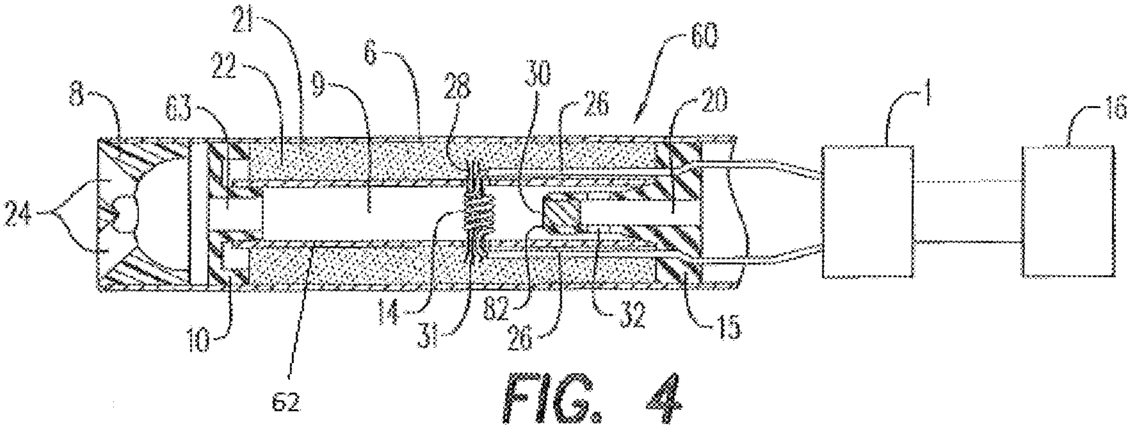
FIG. 4 is a cross-sectional view of an embodiment wherein an e-vaping device includes an air flow diverter, in accordance with an example embodiment.

In use, liquid material is transferred from the liquid supply reservoir 22 and/or liquid storage medium 21 in proximity of the 14 heater by capillary action in the wick 28. In one embodiment, the wick 28 has a first end portion 29 and a second opposite end portion 31 as shown in FIG. 4. The first end portion 29 and the second end portion 31 extend into opposite sides of the liquid storage medium 21 for contact with liquid material contained therein. The heater 14 at least partially surrounds a central portion of the wick 28 such that when the heater 14 is activated, the liquid in the central portion of the wick 28 is vaporized by the heater 14 to vaporize the liquid material and form an aerosol.

One advantage of an embodiment is that the liquid material in the liquid supply reservoir 22 is protected from oxygen (because oxygen cannot generally enter the liquid storage portion via the wick) so that the risk of degradation of the liquid material is significantly reduced. Moreover, in some embodiments in which the outer tube 6 is not clear, the liquid supply reservoir 22 is protected from light so that the risk of degradation of the liquid material is significantly reduced. In addition this embodiment may reduce the amount of diffusion of water into the liquid, and of materials of the liquid out. Thus, a high level of shelf-life and cleanliness can be maintained.

Figure 2B:
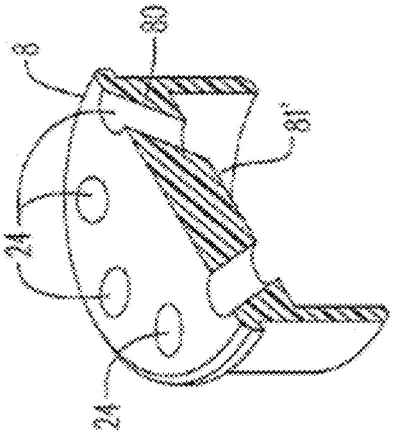
FIG. 2B is a cross-sectional view along line B-B of the mouth end insert of FIG. 2A, in accordance with an example embodiment.
Figure 2A:
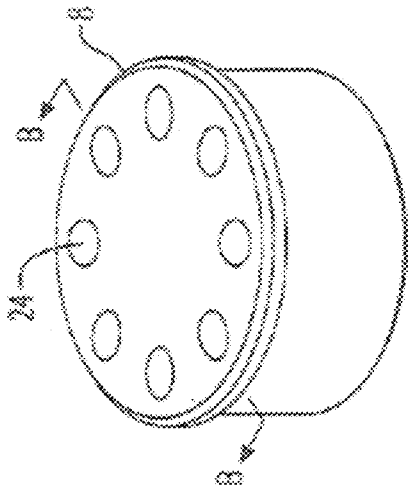
FIG. 2A is a perspective view of a mouth end insert for use with the e-vaping device of FIGS. 1A and 1B, in accordance with an example embodiment.

As shown in FIGS. 2A and 2B, the mouth end insert 8, includes at least two diverging outlets 24 (e.g., 3, 4, 5 or more). The outlets 24 of the mouth end insert 8 are located at ends of off-axis passages 80 and are angled outwardly in relation to the longitudinal direction of the e-vaping device 60 (i.e., divergently). As used herein, the term “off-axis” denotes at an angle to the longitudinal direction of the e-vaping device. Also, the mouth end insert (or flow guide) 8 may include outlets uniformly distributed around the mouth end insert 8 so as to substantially uniformly distribute aerosol in an adult vaper’s mouth during use. Thus, as the aerosol passes into an adult vaper’s mouth, the aerosol enters the mouth and moves in different directions so as to provide a full mouth feel as compared to e-vaping devices having an on-axis single orifice which directs the aerosol to a single location in an adult vaper’s mouth.

In addition, the outlets 24 and off-axis passages 80 are arranged such that droplets of unaerosolized liquid material carried in the aerosol impact interior surfaces 81 at mouth end insert and/or interior surfaces of the off-axis passages such that the droplets are removed or broken apart. In an embodiment, the outlets of the mouth end insert are located at the ends of the off-axis passages and are angled at 5 to 60 degrees with respect to the central axis of the outer tube 6 so as to more completely distribute aerosol throughout a mouth of an adult vaper during use and to remove droplets.

Preferably, each outlet has a diameter of about 0.015 inch to about 0.090 inch (e.g., about 0.020 inch to about 0.040 inch or about 0.028 inch to about 0.038 inch). The size of the outlets 24 and off-axis passages 80 along with the number of outlets can be selected to adjust the resistance to draw (RTD) of the e-vaping device 60, if desired.

As shown in FIG. 1A, an interior surface 81 of the mouth end insert 8 can comprise a generally domed surface. Alternatively, as shown in FIG. 2B, the interior surface 81' of the mouth end insert 8 can be generally cylindrical or frustoconical, with a planar end surface. The interior surface is substantially uniform over the surface thereof or symmetrical about the longitudinal axis of the mouth end insert 8. However, in other embodiments, the interior surface can be irregular and/or have other shapes.

The mouth end insert 8 is integrally affixed within the tube 6 of the cartridge 70. Moreover, the mouth end insert 8 may be formed of a polymer selected from the group consisting of low density polyethylene, high density polyethylene, polypropylene, polyvinylchloride, polyetheretherketone (PEEK) and combinations thereof. The mouth end insert 8 may also be colored if desired.

In an embodiment, the e-vaping device 60 also includes various embodiments of an air flow diverter or air flow diverter means, which are shown in FIGS. 4, 6, 8, 13, 15-17. The air flow diverter is operable to manage air flow at or about around the heater so as to abate a tendency of drawn air to cool the heater, which could otherwise lead to diminished aerosol output.

Figure 5:
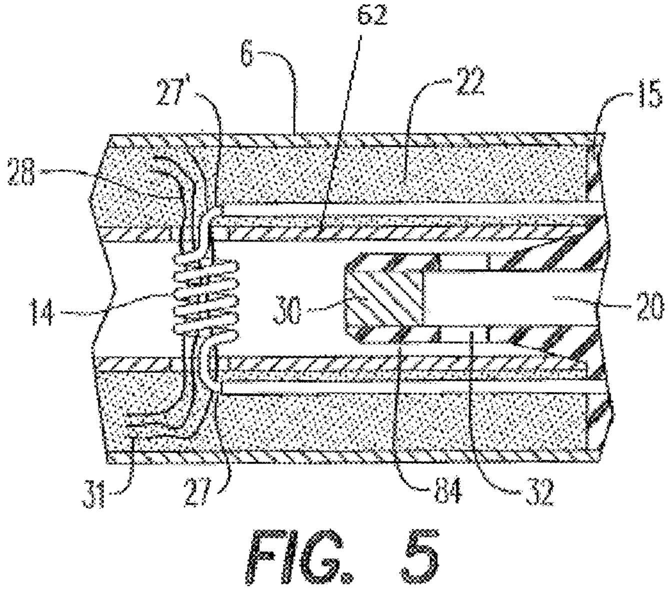
FIG. 5 is an enlarged view of the air flow diverter of the e-vaping device of FIG. 4, in accordance with an example embodiment.

In one embodiment, as shown in FIGS. 4 and 5, the e-vaping device 60 can include an air flow diverter comprising an impervious plug 30 at a downstream end 82 of the central air passage 20 in seal 15. The central air passage 20 is an axially extending central passage in seal 15 and inner tube 62. The seal 15 seals the upstream end of the annulus between the outer and inner tubes 6, 62. The air flow diverter may include at least one radial air channel 32 directing air from the central passage 20 outward toward the inner tube 62 and into an outer air passage 9 defined between an outer periphery of a downstream end portion of the seal 15 and the inner wall of inner tube 62.

The diameter of the bore of the central air passage 20 is substantially the same as the diameter of the at least one radial air channel 32. Also, the diameter of the bore of the central air passage 20 and the at least one radial air channel 32 may range from about 1.5 mm to about 3.5 mm (e.g., about 2.0 mm to about 3.0 mm). Optionally, the diameter of the bore of the central air passage 20 and the at least one radial air channel 32 can be adjusted to control the resistance to draw of the e-vaping device 60. In use, the air flows into the bore of the central air passage 20, through the at least one radial air channel 32 and into the outer air passage 9 such that a lesser portion of the air flow is directed at a central portion of the heater 14 so as to reduce or minimize the aforementioned cooling effect of the airflow on the heater 14 during heating cycles. Thus, incoming air is directed away from the center of the heater 14 and the air velocity past the heater is reduced as compared to when the air flows through a central opening in the seal 15 oriented directly in line with a middle portion of the heater 14.

Figure 6:
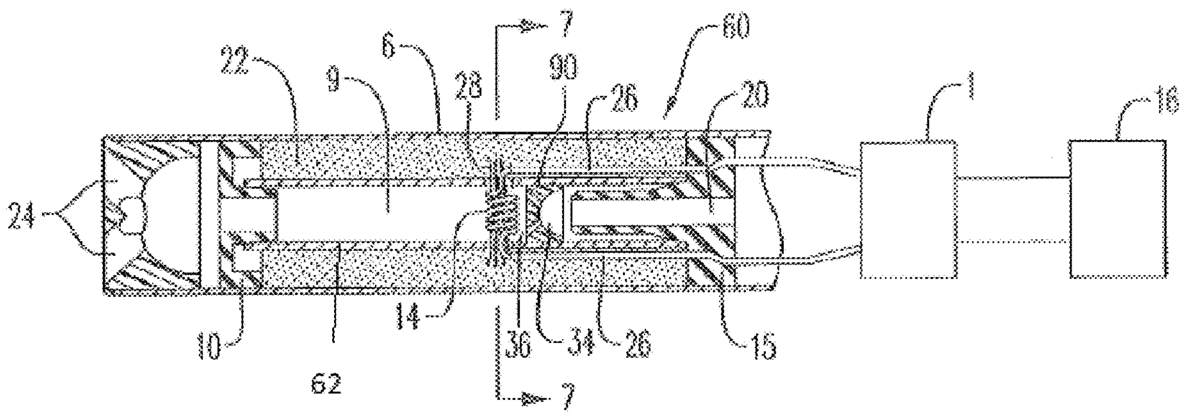
FIG. 6 is a cross-sectional view of an embodiment wherein an e-vaping device includes an air flow diverter, in accordance with an example embodiment.

In another embodiment, as shown in FIGS. 6 and 7, the air flow diverter can be in the form of a disc 34 positioned between the downstream end of seal 15 and the heater 14. The disc 34 includes at least one orifice 36 in a transverse wall at a downstream end of an outer tubular wall 90. The at least one orifice 36 may be off-axis so as to direct incoming air outward towards the inner wall of tube 62. During a puff, the disc 34 is operable to divert air flow away from a central portion of the heater 14 so as to counteract the tendency of the airflow to cool the heater as a result of a strong or prolonged draw by an adult vaper. Thus, the heater 14 is substantially reduced or prevented from cooling during heating cycles so as to reduce or prevent a drop in the amount of aerosol produced during a puff.

Figure 14:
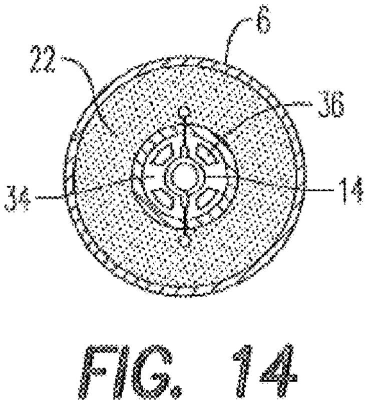
FIG. 14 is a cross-sectional view along line A'-A' of the e-vaping device of FIG. 13, in accordance with an example embodiment.

As shown in FIGS. 13 and 14, the heater 14 is oriented longitudinally within the inner tube 62 and the disc 34 includes at least one orifice 36 arranged to direct air flow non-centrally and/or radially away from the centralized location of the heater 14. In embodiment where the heater 14 is oriented longitudinally within the inner tube 62 and adjacent an inner wall of the inner tube 62, the orifices 36 can be arranged to direct at least a portion of the airflow away from the heater 14 so as to abate the cooling effect of the air flow upon the heater 14 during a power cycle and/or be arranged to decelerate the air flow to achieve the same effect.

In yet another embodiment, as shown in FIG. 8, the air flow diverter comprises a frustoconical section 40 extending from the downstream end 82 of a shortened central air passage 20. By shortening the central passage 20 as compared to other embodiments, the heater 14 is positioned farther away from the central passage 20 allowing the air flow to decelerate before contacting the heater 14 and lessen the tendency of the air flow to cool the heater 14. Alternatively, the heater 14 can be moved closer to the mouth end insert 8 and farther away from the central air passage 20 to allow the air flow time and/or space sufficient to decelerate to achieve the same cooling-abatement effect.

The addition of the frustoconical section 40 provides a larger diameter bore size which can decelerate the air flow so that the air velocity at or about the heater 14 is reduced so as to abate the cooling effect of the air on the heater 14 during puff cycles. The diameter of the large (exit) end of the frustoconical section 40 ranges from about 2.0 mm to about 4.0 mm, and preferably about 2.5 mm to about 3.5 mm.

The diameter of the bore of the central air passage 20 and the diameter of the smaller and/or larger end of the frustoconical section 40 can be adjusted to control the resistance to draw of the e-vaping device 60.

The air flow diverter of the various embodiments channels the air flow by controlling the air flow velocity (its speed and/or the direction of the air flow). For example, the air flow diverter can direct air flow in a particular direction and/or control the speed of the air flow. The air flow speed may be controlled by varying the cross sectional area of the air flow route. Air flow through a constricted section increases in speed while air flow through a wider section decreases speed.

In an embodiment, the e-vaping device 60 may be about the same size as a conventional cigarette. In some embodiments, the e-vaping device 60 can be about 80 mm to about 110 mm long, preferably about 80 mm to about 100 mm long and about 7 mm to about 8 mm in diameter. For example, in an embodiment, the e-vaping device is about 84 mm long and has a diameter of about 7.8 mm.

In one embodiment, the e-vaping device 60 of FIGS. 1A, 1B, 4, 6 and 8 can also include a filter segment upstream of the heater 14 and operable to restrict flow of air through the e-vaping device 60. The addition of a filter segment can aid in adjusting the resistance to draw.

The outer tube 6 and/or the inner tube 62 may be formed of any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK), ceramic, and polyethylene. In one embodiment, the material is light and non-brittle.

Figure 9:
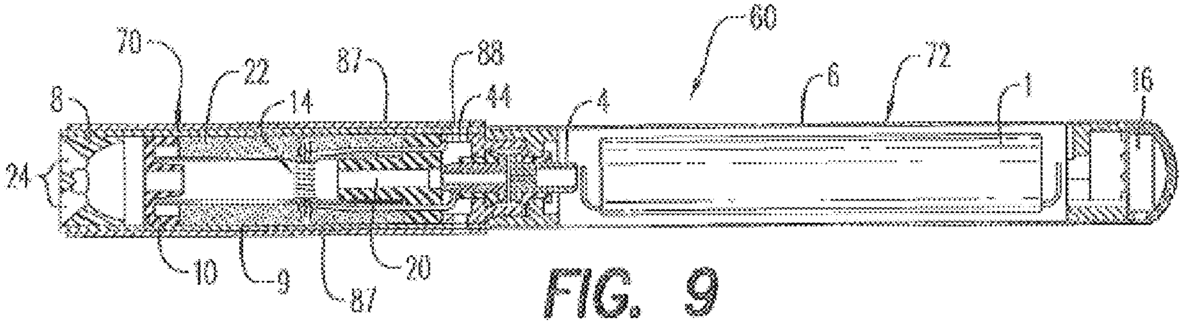
FIG. 9 is a cross-sectional view of an e-vaping device according to the first embodiment and further including a sleeve assembly, in accordance with an example embodiment.

As shown in FIG. 9, the e-vaping device 60 can also include a sleeve assembly 87 removably and/or rotatably positioned about the outer tube 6 adjacent the first section 70 of the e-vaping device 70. Moreover, the sleeve assembly 87 insulates at least a portion of the first section 70 so as to maintain the temperature of the aerosol prior to delivery to the adult vaper. In an embodiment, the sleeve assembly 87 is rotatable about the e-vaping device 60 and includes spaced apart slots 88 arranged transversely about the sleeve assembly such that the slots 88 line up with the air inlets 44 in the first section 70 to allow air to pass into the e-vaping device 60 when an adult vaper draws a puff. Before or during vaping, the adult vaper can rotate the sleeve assembly 87 such that the air inlets 44 are at least partially blocked by the sleeve assembly 87 so as to adjust the resistance to draw and/or ventilation of the e-vaping device 60.

The sleeve assembly 87 is made of silicone or other pliable material so as to provide a soft mouthfeel to the adult vaper. However, the sleeve assembly 87 may be formed in one or more pieces and can be formed of a variety of materials including plastics, metals and combinations thereof. In an embodiment, the sleeve assembly 87 is a single piece formed of silicone. The sleeve assembly 87 may be removed and reused with other e-vaping devices or can be discarded along with the first section 70. The sleeve assembly 87 may be any suitable color and/or can include graphics or other indicia.

As shown in FIG. 10, the e-vaping device 60 can also include an aroma strip 89 located on an outer surface 91 of at least one of the first section 70 and the second section 72. Alternatively, the aroma strip 89 can be located on a portion of the sleeve assembly 87. The aroma strip 89 is located between the battery of the device and the heater such that the aroma strip 89 is adjacent an adult vaper's nose during vaping. The aroma strip 89 may include a flavor aroma gel, film or solution including a fragrance material that is released before and/or during vaping. In one embodiment, the flavor aroma of the gel, fluid and/or solution can be released by the action of a puff which may open a vent over the aroma strip when positioned inside the first section 70 (not shown). Alternatively, heat generated by the heater 14 can cause the release of the aroma.

In one embodiment, the aroma strip 89 can include tobacco flavor extracts. Such an extract can be obtained by grinding tobacco material to small pieces and extracting with an organic solvent for a few hours by shaking the mixture. The extract can then be filtered, dried (for example with sodium sulfate) and concentrated at controlled temperature and pressure. Alternatively, the extracts can be obtained using techniques known in the field of flavor chemistry, such as the Solvent Assisted Flavor Extraction (SAFE) distillation technique (Engel et al. 1999), which allows separation of the volatile fraction from the non-volatile fraction. Additionally, pH fractionation and chromatographic methods can be used for further separation and/or isolation of specific compounds. The intensity of the extract can be adjusted by diluting with an organic solvent or water.

The aroma strip 89 can be a polymeric or paper strip to which the extract can be applied, for example, using a paintbrush or by impregnation. Alternatively, the extract can be encapsulated in a paper ring and/or strip and released manually by the adult vaper, for example by squeezing during vaping the aroma strip 89.

Figure 12:
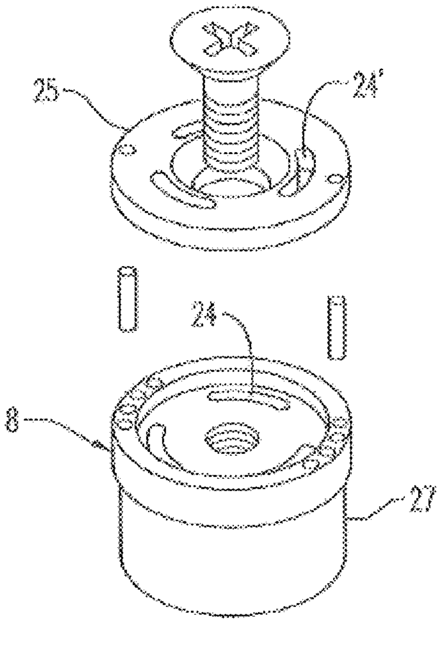
FIG. 12 is an exploded view of the mouth end insert of FIG. 11, in accordance with an example embodiment.
Figure 11:
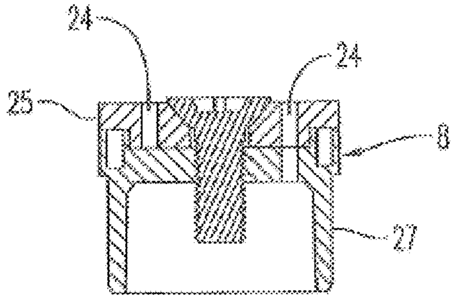
FIG. 11 is a cross-sectional view of a second embodiment of a mouth end insert for use with the e-vaping device of FIGS. 1A, 1B, 4, 6 and 8, in accordance with an example embodiment.

As shown in FIGS. 11 and 12, in an alternative embodiment, the e-vaping device of FIGS. 1A, 1B, 4, 6 and 8 can includes a mouth end insert 8 having a stationary piece 27 and a rotatable piece 25. Outlets 24, 24' are located in each of the stationary piece 27 and the rotatable piece 25. One or more of the outlets 24, 24' align as shown to allow aerosol to enter an adult vaper's mouth. However, the rotatable piece 25 can be rotated within the mouth end insert 8 so as to at least partially block one or more of the outlets 24 in the stationary mouth end insert 27. Thus, the consumer can adjust the amount of aerosol drawn with each puff. The outlets 24, 24' can be formed in the mouth end insert 8 such that the outlets 24, 24' diverge to provide a fuller mouth feel during inhalation of the aerosol.

In another embodiment, the air flow diverter comprises the addition of a second wick element adjacent to but just upstream of the heater 14. The second wick element diverts portions of the air flow about the heater 14.

Figure 15:
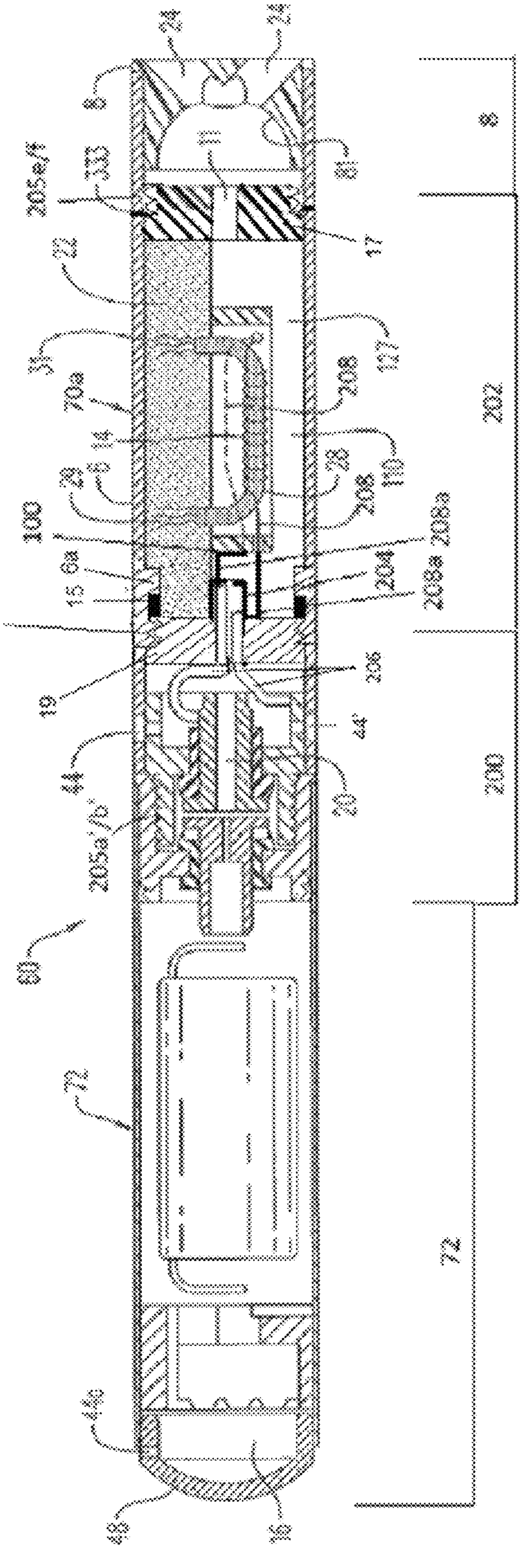
FIG. 15 is a cross-sectional view of an embodiment wherein an e-vaping device includes an air flow diverter, in accordance with an example embodiment.

In another embodiment, as shown in FIG. 15, the e-vaping device 60 comprises a tank (or first section) 70*a*, sometimes referred to as an "e-vaping tank," and a reusable fixture (or second section) 72, which may be coupled together at, for example, threaded connection 205*a*'/b' (205*a*' being the male threaded connection and 205*b*' being the female threaded connection) via the use of an adapter 200 (described below in detail).

Still referring to FIG. 15, in this embodiment, the first section 70*a* may be reusable. Alternatively, first section 70*a* may be disposable. First section 70*a* may include an outer tube 6 (or casing) extending in a longitudinal direction. The first section 70*a* may have two major portions, which may include tank 202, and mouth piece 8, where these two sections may be connected. First section 70*a* may include liquid supply reservoir in the form of a truncated cylindrical tank reservoir 22. Tank reservoir 22 may include a separately formed, self-supporting (discrete) hollow body constructed of a heat-resistant plastic or woven fiberglass. In an embodiment, the tank reservoir 22 can be generally in the form of elongate partial cylinder, one side of which is truncated. In an embodiment, the tank reservoir 22 has a transverse dimension, such as in the direction of arrow "x" in FIG. 16, and is truncated such that the aforementioned transverse dimension is approximately two-thirds of the diameter of the tank reservoir 22. The aforementioned transverse dimension may vary in other embodiments, depending on design requirements such as a desired capacity of the tank or a need for space within the casing 6 for heaters and for channeling airflow. For example, in the embodiment shown in FIG. 15, the tank reservoir 22 has a semi-circular cross-section or a transverse dimension equal to one-half the tank diameter. In an alternative embodiment, tank reservoir 22 may be an annulus located around the inner periphery of tube 6.

The adapter 200 (sometimes referred to as a "bridge," or a "connector") may be located between the reusable fixture 72 and the tank 70*a*. The adapter 200 may be used to connect a female threaded connection on reusable section 72 to a female threaded connection on tank 202, as shown in FIG. 15. The adapter 200 may include the central air passage 20 and air inlets 44/44'. Electrical leads 206 may extend from adapter 200 into male stub 204 in order to make electrical contact with electrical connections 208*a* that are connected to electrical leads 208 which provide power to heater 14. Adapter 200 may be connected to reusable section 72 via the threaded connections 205*a*'/b'. Adapter 200 may be connected to tank 70*a* via threaded connections 205*c/d* (i.e., respective male and female threaded connections).

In one embodiment, the tank reservoir 22 can be constructed separate from the casing 6 and comprise a longitudinally extending planar panel 101 and an arcuate, longitudinally extending panel 103. The arcuate panel 103 may conform or mate with an interior surface 127 of the outer tube 6. It is envisioned that the tank reservoir 22 may be held in place against the interior 127 of the outer casing 6 by conveniences such as spaced ridges 333 and 333' at predetermined desired (or, a alternatively predetermined) locations along the interior 127 of the outer casing 6, a friction fit or a snap fit or other convenience. End wall 17 may seal one end of tank reservoir 22. Seal 15 may fit between stub 6*a* and the end wall 19 of adapter 200 to assist in sealing the other end of the tank reservoir 22. Seal 15 may be made of an absorbent material to absorb any liquid that might escape inadvertently from the tank reservoir 22. Mouthpiece 8 may screw onto an end of tank 202 via threaded connections 205*e/f* (i.e., respective male and female threaded connections). End wall 19 may screw onto the other end of tank 202 via threaded connections 205*c/d* (i.e., respective male and female threaded connections). End wall 17 would be each provided apertures 11 to allow air and/or aerosol to pass there through.

In one embodiment, a wick 28 may be in communication with the interior of the supply reservoir 22 and in communication with a heater 14 such that the wick 28 draws liquid via capillary action from the tank reservoir 22 into proximity of the heater 14. As described previously, the wick 28 is a bundle of flexible filaments whose end portions 29 and 31 are disposed within the confines of the tank reservoir 22. The contents of the liquid supply reservoir 22 may be a liquid, as previously described, together with the end portions 29, 31 of the wick 28. The end portions 29, 31 of the wick 28 occupy substantial portions of the tank interior such that orientation of the vaping article 60 does not impact the ability of the wick 28 to draw liquid. Optionally, the tank reservoir 22 may include filaments or gauze or a fibrous web to maintain distribution of liquid within the tank reservoir 22.

As described previously, the heater 14 may comprise a coil winding of electrically resistive wire about a portion of the wick 28. Instead or in addition, the heater may comprise a single wire, a cage of wires, printed "wire," metallic mesh, or other arrangement instead of a coil. The heater 14 and the associated wick portion 28 may be disposed centrally of the planar panel 101 of the tank reservoir 22 as shown in FIG. 16, or could be placed at one end portion thereof or may be one or two or more heaters 14 disposed either centrally or at opposite end portions of the planar panel 101.

Figure 16:
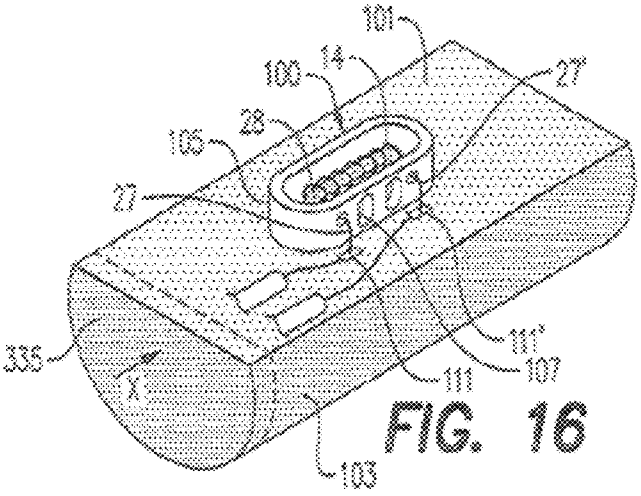
FIG. 16 is an enlarged view of an air flow diverter and tank reservoir of the e-vaping device of FIG. 15, in accordance with an example embodiment.

Referring now to FIGS. 15 and 16, in an embodiment, a flow diverter 100 is provided adjacent the heater 14. The diverter 100 may take the form of a generally oval shield or wall 105 extending outwardly from the plane of the planar panel 101 and proximate to the heater 14 and the wick 28 such that an approaching air stream is diverted away from the heater 14 so that the amount of air drawn directly across the heater is reduced in comparison the arrangements lacking a flow diverter 100.

The oval wall 105 is open ended so that when the heater 14 is activated to freshly produce aerosol in its proximity, such supersaturated aerosol may be withdrawn from the confines of the diverter 100. Not wishing to be bound by theory, such arrangement releases aerosol by utilizing the drawing action or venturi effect of the air passing by the heater 14 and the open ended diverter 100. Optionally, holes 107 are provided in the wall 105 of the diverter 100 so that the drawing action of the air tending to withdraw aerosol from the confines of the diverter 100 does not work against a vacuum. These holes 107 may be sized to provide an optimal amount of air to be drawn into the confines of the diverter 100. Thereby, the amount of air being drawn into contact with the heater 14 is reduced and controlled, and a substantial portion of the approaching air stream is diverted and by-passes the heater 14, even during aggravated draws upon the e-vaping device 60.

In addition, the holes 107 may be utilized for routing of end portions 27, 27' of the heater 14 or separate holes or notches may be provided. In the embodiment of FIG. 16, the end portions 27, 27' of the heater 14 and the electric leads 26 and 26' are connected at electric contacts 111, 111' established on the planar panel 101 adjacent the location of the diverter 100. The electrical contacts 111, 111' may instead be established on the wall 105' itself, as shown in FIG. 17.

Referring back to FIG. 16, the oval diverter shield 105 is symmetrical along the longitudinal axis such that the diverter 100 may be placed in the orientation as shown in FIG. 16 or 180 degrees from that orientation, which facilitates manufacture and assembly of the vaping article 60.

Figure 17:
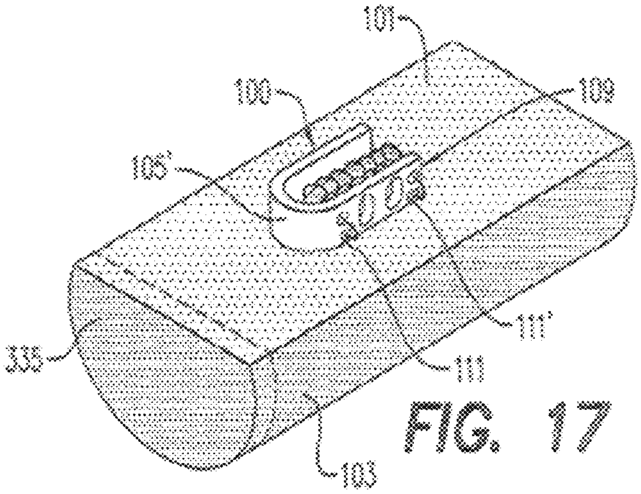
FIG. 17 is an enlarged view of an alternate air flow diverter and tank reservoir of the e-vaping device of FIG. 15, in accordance with an example embodiment.

Referring now to the FIG. 17, the diverter 100 may be configured instead to have an oval wall 105' that includes an open-ended downstream portion 109, which further facilitates the release of aerosol from about the heater 14. It is envisioned that the wall 105 of the diverter 100 may take a form of a shallow "u" or "v" and may include an arched portion at least partially superposing the heater 14. In the embodiments shown in FIGS. 15, 16 and 17, the oval shield wall 105 is oriented with its longitudinal axis generally parallel to the longitudinal axis of the vaping article 60.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed:

1. A method of operating an e-vaping device including a controller, a power source, a liquid storage portion for storing liquid material, a vaporizer, a memory device, and a switching architecture, the method comprising:

receiving, at the controller, first information stored in the memory device, and controlling the switching architecture to prevent current from flowing through a heater included in the vaporizer while the controller receives the first information from the memory device.

2. The method of claim 1 wherein the switching architecture includes at least a first electronic switch, and the method further comprises:

detecting a flow of air through an air channel of the e-vaping device; and based on the detection of the flow of air, controlling the first electronic switch to allow current to flow through the heater, and sending a power signal to the heater to cause the heater to generate heat.

3. The method of claim 2 wherein, the e-vaping device includes a power supply line configured to supply power from the power source to the heater, and the first electronic switch is located on the power supply line or connected in between the power supply line and the heater, such that the first electronic switch controls an electrical connection between the heater and the power supply line, and the controlling the switching architecture to prevent current controls the first electronic switch to open the electrical connection between the heater and the power supply line such that current is prevented from flowing through the heater.

4. The method of claim 2 wherein, the e-vaping device includes a ground line forming an electrical path between the heater and a ground node of the e-vaping device, and the first electronic switch is connected in between the ground node and the heater, such that the first electronic switch controls an electrical connection between the heater and the ground node, and the controlling the switching architecture to prevent current controls the first electronic switch to open the electrical connection between the heater and the ground node such that current is prevented from flowing through the heater.

5. The method of claim 1 further comprising:

preventing the heater from generating heat, when the first information indicates an amount of liquid material stored in the liquid storage portion is below a threshold level.

* * * * *